(12) United States Patent
Guo et al.

(10) Patent No.: US 11,645,051 B2
(45) Date of Patent: May 9, 2023

(54) MINI PROGRAM PRODUCTION METHOD AND APPARATUS, TERMINAL, AND STORAGE MEDIUM

(71) Applicant: Tencent Technology (Shenzhen) Company Limited, Shenzhen (CN)

(72) Inventors: Peiran Guo, Shenzhen (CN); Haicheng Su, Shenzhen (CN); Shida Zhu, Shenzhen (CN); Yuli Cai, Shenzhen (CN); Li Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/338,516

(22) Filed: Jun. 3, 2021

(65) Prior Publication Data

US 2021/0294583 A1 Sep. 23, 2021

Related U.S. Application Data

(63) Continuation of application No. PCT/CN2020/096814, filed on Jun. 18, 2020.

(30) Foreign Application Priority Data

Jul. 15, 2019 (CN) .......................... 201910639193.8

(51) Int. Cl.
G06F 8/38 (2018.01)
(52) U.S. Cl.
CPC ..................................... G06F 8/38 (2013.01)
(58) Field of Classification Search
CPC ....................................................... G06F 8/38
See application file for complete search history.

(56) References Cited

U.S. PATENT DOCUMENTS

2004/0162803 A1* 8/2004 Rhoads ................... G06Q 10/10
2005/0198610 A1* 9/2005 Fildebrandt .............. G06F 8/38
717/109

(Continued)

FOREIGN PATENT DOCUMENTS

CN 106610826 A 5/2017
CN 109828756 A 5/2019
(Continued)

OTHER PUBLICATIONS

Luck332, "Mini Program Visual Design Tool-Support One-Click Export of Mini Programs, WebApp and Background Management", Aug. 9, 2017, 10 pgs., Retrieved from the Internet: https://blog.csdn.net/luck332/article/detaiis/76974170.

(Continued)

*Primary Examiner* — Phillip H Nguyen
(74) *Attorney, Agent, or Firm* — Morgan, Lewis & Bockius LLP

(57) ABSTRACT

This application discloses a mini program production method performed at a terminal. The method includes: displaying a mini program production interface including a panel region and an editing region, the panel region being provided with n types of basic user interface (UI) elements, n being a positive integer; in response to receiving an editing operation on a target basic UI element, generating a program interface of the mini program by editing, in the editing region, one or more target basic UI elements, the target basic UI element being selected from the n types of basic UI elements; generating a program package of the mini program according to the program interface; and in response to receiving a preview operation, transmitting the program package of the mini program to the host application program for execution.

20 Claims, 14 Drawing Sheets

(56) References Cited

U.S. PATENT DOCUMENTS

| | | | | |
|---|---|---|---|---|
| 2006/0041879 | A1* | 2/2006 | Bower | G06F 9/451 |
| | | | | 717/165 |
| 2011/0161941 | A1 | 6/2011 | Thomson et al. | |
| 2012/0079452 | A1* | 3/2012 | Nir-Buchbinder | G06F 8/33 |
| | | | | 717/113 |
| 2017/0286068 | A1 | 10/2017 | Shiokawa et al. | |
| 2018/0181385 | A1 | 6/2018 | Riedl | |
| 2018/0343318 | A1 | 11/2018 | Yuan et al. | |
| 2018/0349108 | A1 | 12/2018 | Brebner | |

FOREIGN PATENT DOCUMENTS

| | | | |
|---|---|---|---|
| CN | 109960491 | A | 7/2019 |
| CN | 110968305 | A | 4/2020 |
| EP | 2256624 | A1 | 12/2010 |
| WO | WO 2009116163 | A1 | 9/2009 |
| WO | WO 2016049626 | A1 | 3/2016 |
| WO | WO 2016113914 | A1 | 7/2016 |

OTHER PUBLICATIONS

Dan Ding Ge, "The World's First Visual Development Tool for WeChat Mini Programs is Now Online. You Can Develop WeChat Applets Without Understanding the Code!", Calm Brother, Nov. 27, 2016, 11 pgs., Retrieved from the Internet: https://mp.weixin.qq.com/s/nPvDLYugCA2sHg-QodEo3A.

Tencent Technology, ISR, PCT/CN2020/096814, dated Sep. 18, 2020, 3 pgs.

Extended European Search Report, EP20841007.6, dated May 25, 2022, 11 pgs.

Tencent Technology, WO, PCT/CN2020/096814, Sep. 18, 2020, 5 pgs.

Tencent Technology, IPRP, PCT/CN2020/096814, Jan. 18, 2022, 6 pgs.

Tencent Technology, JP Office Action, Japanese Patent Application No. 2021-547744, dated Sep. 12, 2022, 6 pgs.

* cited by examiner

MINI PROGRAM PRODUCTION METHOD AND APPARATUS, TERMINAL, AND STORAGE MEDIUM

CROSS REFERENCE TO RELATED APPLICATIONS

This application is a continuation application of PCT Patent Application No. PCT/CN2020/096814, entitled "MINI-PROGRAM PRODUCTION METHOD AND APPARATUS, AND TERMINAL AND STORAGE MEDIUM" filed on Jun. 18, 2020, which claims priority to Chinese Patent Application No. 201910639193.8, filed with the State Intellectual Property Office of the People's Republic of China on Jul. 15, 2019, and entitled "MINI-PROGRAM PRODUCTION METHOD AND APPARATUS, TERMINAL, AND STORAGE MEDIUM", all of which are incorporated herein by reference in their entirety.

FIELD OF THE TECHNOLOGY

Embodiments of this application relate to the programming field, and in particular, to a mini program production method and apparatus, a terminal, and a storage medium.

BACKGROUND OF THE DISCLOSURE

Accompanied with the development of research and development technologies of applications, application providers provide an ecosystem of "host application programs and mini programs". The mini program is a program executed in a host application program. A user may add and use various mini programs in a host application program at any time only by installing the host application program.

After an application provider provides a host application program as a program platform, all companies, service agencies, even personal users (programmers for short) may research and develop different types of mini programs to submit to the application provider, and the application provider provides different services by using the host application program as a running container. When a mini program needs to be researched and developed, the programmer needs to download developer tools and development documents from the program platform of the host application program. The programmer uses the developer tools for code editing by referring to all requirements specified in the development documents for reference. After a program package of the mini program is successfully obtained through editing, the program package of the mini program is submitted to the program platform of the host application program, and the program package may be published for users to use after succeeding in auditing.

However, because of the use of the developer tools, the programmer is required to have a relatively professional code editing ability and a long period of knowledge learning and experience accumulation to successfully complete the development process, resulting in a relatively high difficulty and low efficiency in development of a mini program.

SUMMARY

Embodiments of this application provide a mini program production method and apparatus, a terminal, and a storage medium, which can reduce the difficulty and improve the efficiency in the development of the mini program. The technical solutions are as follows.

According to an aspect, a mini program production method is performed at a terminal, the mini program being a program executed in a host application program, and the method comprising:

displaying a mini program production interface including a panel region and an editing region, the panel region being provided with n types of basic user interface (UI) elements, n being a positive integer;

in response to receiving an editing operation on a target basic UI element, generating a program interface of the mini program by editing, in the editing region, one or more target basic UI elements, the target basic UI element being selected from the n types of basic UI elements;

generating a program package of the mini program according to the program interface; and in response to receiving a preview operation, transmitting the program package of the mini program to the host application program for execution.

According to another aspect, a mini program production apparatus is provided, the mini program being a program executed in a host application program, and the apparatus including:

a production interface display module, configured to display a mini program production interface including a panel region and an editing region, the panel region being provided with n types of basic user interface (UI) elements, n being a positive integer;

a program interface generation module, configured to, in response to receiving an editing operation on a target basic UI element, generate a program interface of the mini program by editing, in the editing region, one or more target basic UI elements, the target basic UI element being selected from the n types of basic UI elements; and a program package generation module, configured to generate a program package of the mini program according to the program interface.

According to another aspect, a terminal is provided, the terminal including a processor and a memory, the memory storing at least one instruction, the at least one instruction being executed by the processor to implement the mini program production method according to the foregoing aspect.

According to another aspect, a non-transitory computer-readable storage medium is provided, storing at least one instruction, the at least one instruction being executed by a processor to implement the mini program production method according to the foregoing aspect.

According to another aspect, a computer program product is provided, including computer instructions, the computer instructions being stored in a computer-readable storage medium. A processor of a computer device reads the computer instructions from the computer-readable storage medium, and executes the computer instructions, so that the computer device performs the mini program production method provided in the foregoing aspect or in optional implementations of the foregoing aspect.

In this embodiment of this application, when producing a mini program, a mini program production interface including a panel region and an editing region is displayed, and in response to receiving an editing operation on a target basic UI element, a program interface of the mini program is obtained by editing in the editing region according to the target basic UI element, and therefore, a program package of the mini program is generated according to the program interface of the mini program. Compared with development processes of related mini programs, by adopting the method provided in this application, a program related to a current operation may be generated fully and synchronously in the backend by receiving a visualization operation of a user who does not need to be a developer having strong research and development ability. Therefore, normal users may complete a visualization production of the mini program without manually editing code, thereby reducing the difficulty and improving the efficiency in the development the mini program.

DESCRIPTION OF EMBODIMENTS

To make the objectives, technical solutions, and advantages of this application clearer, the following further describes implementations of this application in detail with reference to the accompanying drawings.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

To facilitate understanding, the following explains and illustrates terms involved in the embodiments of this application.

Visualization: visualization is a theory, method, and technology that converts data into graphics and images for display on a screen by using computer graphics and image processing technologies and then for interaction processing.

Mini program: a mini program is an application developed based on programing languages and executed in a host application program, that is, a user may run a mini program in a host application program without downloading and installing the mini program.

Host program: in a computer environment, a software environment in which software (such as a mini program in this application) relies for existence is referred to as a host environment, and the environment is referred to as a host. The host is a running environment (that is, the host application program). The host environment (the host application program) may be an operating system, a server program, or an application.

UI element: a UI element is a visual element, and is a basic component of a program interface in a mini program.

Basic UI elements in the embodiments of this application are referred to some UI elements used for implementing common functions in the program interface, that is, the basic UI elements.

An example in which the host application program is an application is used in the following embodiment for description.

Figure 1:
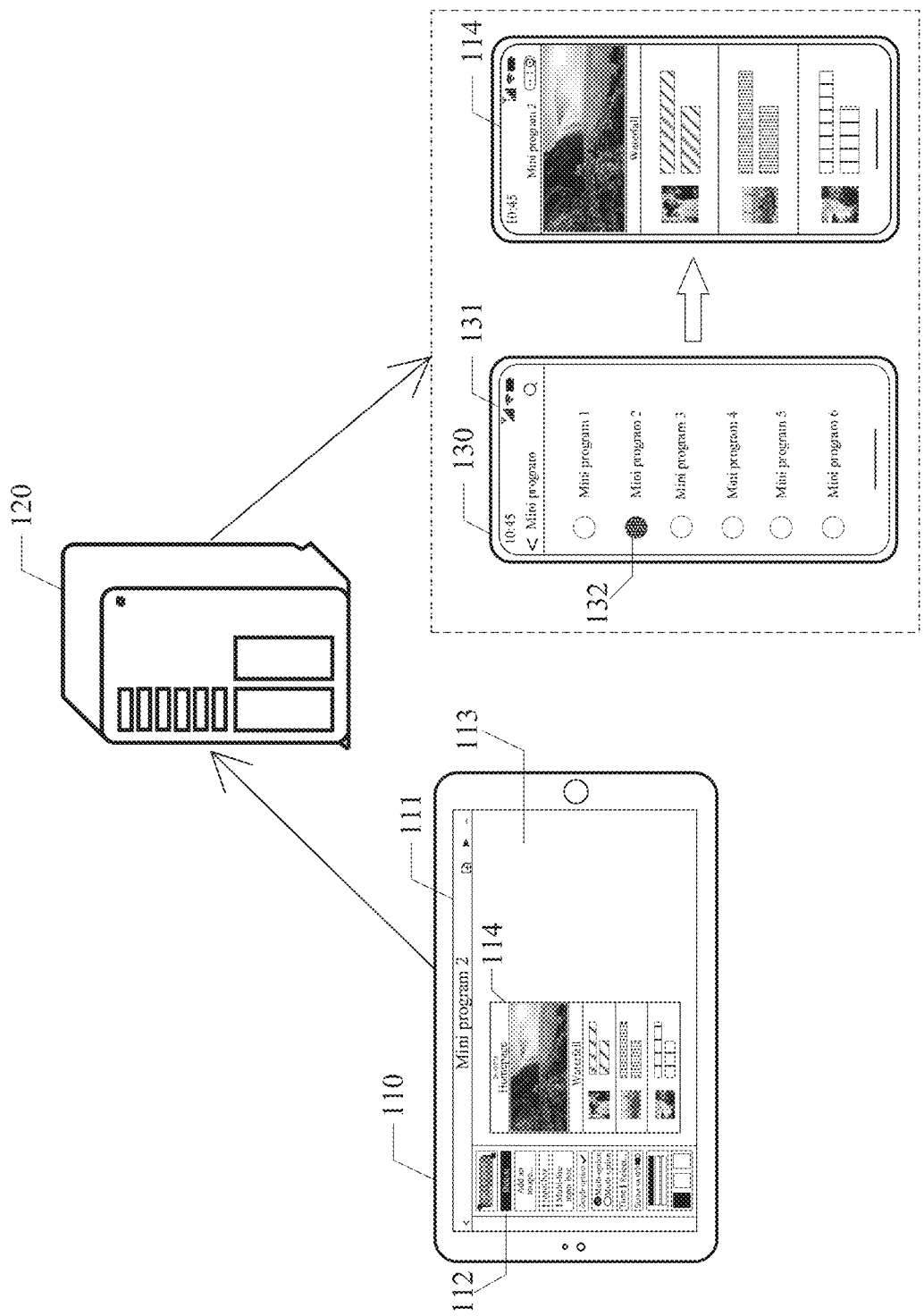
FIG. 1 is a schematic interface diagram of producing a mini program by using a visualization production program according to an exemplary embodiment of this application.

An embodiment of this application provides a mini program production method. FIG. 1 is a schematic diagram of an interface of producing a mini program by using a visualization production program according to an exemplary embodiment of this application.

As shown in FIG. 1, a terminal installed with the visualization production program is a tablet computer 110, a mini program production interface 111 of the visualization production program being displayed on an interface of the tablet computer 110, a panel region 112 and an editing region 113 being displayed on the mini program production interface 111.

The panel region 112 provides a plurality types of basic UI elements, and a user may select a part of basic UI elements from the plurality types of basic UI elements, and add the part of basic UI elements in the panel region 112 to a program interface of the mini program by using a visualization operation (such as a tap operation or a drag operation). For example, as shown in FIG. 1, the visualization production program displays a program interface 114 named "mini program 2" in the editing region 113. Basic UI elements in the program interface 114 is added to the program interface 114 from the panel region 112 by the user through a drag operation.

After a visualization editing is performed on the "mini program 2", the visualization production program generates a program package of the "mini program 2" according to the program interface 114 of the mini program, and transmits the program package to a backend server 120 of a host application program, a terminal installed with the host application program being a mobile phone 130. After the "mini program 2" is audited by the host application program, the "mini program 2" is searched by using a mini program searching interface 131 of the mobile phone 130, and a searched result is to display an icon 132 of the "mini program 2" on the mini program searching interface 131. When the mini program searching interface 131 receives a tap signal on the icon 132, the mini program searching interface 131 jumps to the program interface 114 of the mini program, so as to implement the visualization production of the mini program by using the visualization operation.

Figure 2:
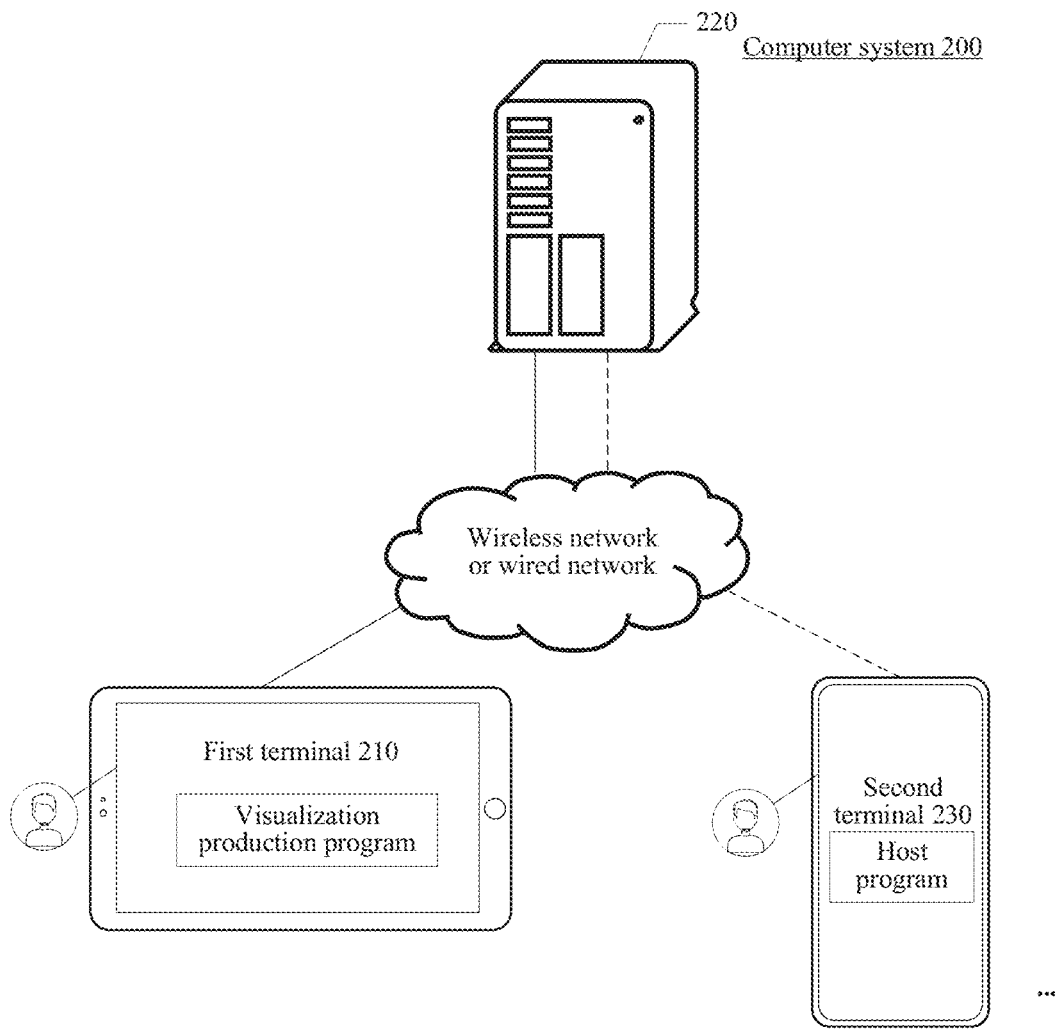
FIG. 2 is a structural block diagram of a computer system according to an exemplary embodiment of this application.

FIG. 2 is a structural block diagram of a computer system 200 according to an exemplary embodiment of this application. The computer system 200 includes a first terminal 210, a server 220, and at least one second terminal 230.

The first terminal 210 and the second terminal 230 may be mobile phones, tablet computers, laptop portable computers, desktop computers, and the like. In the specification, an example in which the first terminal 210 is a tablet computer and the second terminal 230 is a mobile phone is used for description, that is, the first terminal 210 may implement a visualization production of a mini program by providing a touchscreen interaction function.

In some embodiments, the first terminal 210 may be installed with a visualization production program. The visualization production program is configured to implement a mini program production method provided in the following method embodiments, and the visualization production program may have an account log-in function. A user may register and log in to an account of the user in the visualization production program.

The second terminal 230 may be installed with a host application program. The host application program is configured to provide a dependable software environment for the mini program, and the host application program may have an account log-in function. A user may register and log in to an account of the user in the host application program.

In some embodiments, the host application program is an instant messaging application, a news reading application, a social networking application, an online shopping application, or an online payment application, and this is not limited in this embodiment.

The first terminal 210 and the second terminal 230 are connected to the server 220 by using a wired network or a wireless network.

The server 220 may be any one of a server, a server cluster, or a virtual cloud storage or cloud computing center. The server 220 is configured to provide a backend service for the host application program. The server 220 is capable of storing data, and may be configured to store data related to the visualization production program.

In some embodiments, the server 220 is configured to provide a backend service for the visualization production program, and similarly, may be configured to store the data related to the visualization production program.

An example in which the server 220 is configured to provide a backend service for the host application program is used for description in the following embodiment.

In one implementation, after using the first terminal 210 to produce a mini program, a developer uploads a program package of the mini program to the server 220, for the server 220 to audit the mini program and publish the mini program after succeeding in auditing. The user may use the second terminal 230 to search for the published mini program, and select to run the selected mini program by using the host application program.

Figure 3:
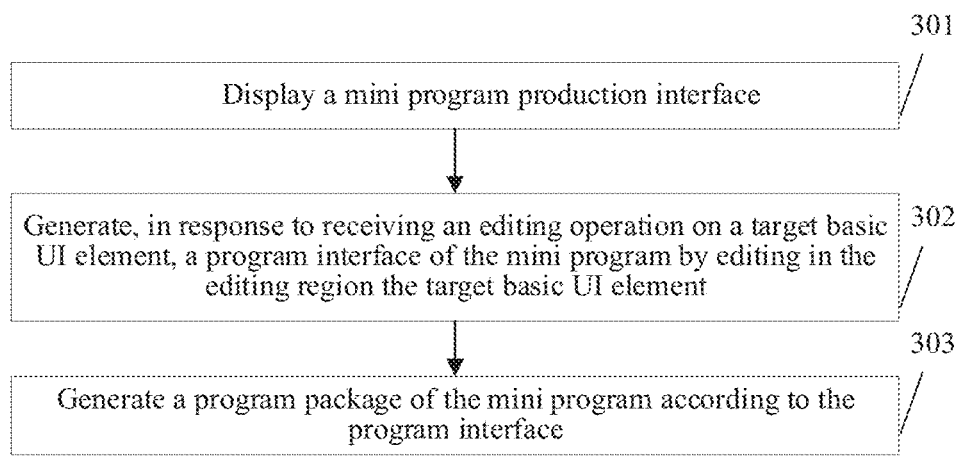
FIG. 3 is a flowchart of a mini program production method according to an exemplary embodiment of this application.

FIG. 3 is a flowchart of a mini program production method according to an exemplary embodiment of this application. An example in which the exemplary embodiment is performed by the first terminal 210 shown in FIG. 2 is used for description. The method includes the following steps.

Step 301. Display a mini program production interface.

In one implementation, the mini program production interface is a UI of a visualization production program. The visualization production program may be an application independent of a host application program. Alternatively, the visualization production program may be a host application program having a mini program production function. This is not limited in this embodiment.

In some embodiments, when a mini program production is implemented by using the visualization production program, the visualization production program displays a mini program production interface, the mini program production interface being configured to provide an operating interface of the mini program production for users. A panel region and an editing region are displayed on the mini program production interface, the panel region being provided with n types of basic UI elements, n being a positive integer. For example, as shown in FIG. 4(a), a panel region 410 and an editing region 430 are displayed on a mini program production interface 400.

The panel region 410 includes, but is not limited a label UI element 411, a button UI element 412, an image UI element 413, a single line input box UI element 414, a multi-line input box UI element 415, a single option UI element 416, a multi-option UI element 417, a time selection UI element 418, a status switch UI element 419, a horizontal list UI element 420, and a vertical list UI element 421.

The label UI element 411 is configured for displaying a segment of text. The button UI element 412 is configured for information confirmation and other events related to determination. The image UI element 413 is configured for adding and displaying an image. The single line input box UI element 414 is configured for providing an input box of a single line text input for a mini program user. The multi-line input box UI element 415 is configured for providing an input box of a multi-line text input for a mini program user. The single option UI element 416 is configured for providing a single-option selection of information lists for a mini program user. The multi-option UI element 417 is configured for providing multiple-option selection of information lists for a mini program user. The time selection UI element 418 is configured for providing a time selection for a mini program user. The status switch UI element 419 is configured for providing a status selection about interfaces for a mini program user. The horizontal list UI element 420 and the vertical list UI element 421 are respectively configured for providing lists displayed horizontally and lists displayed vertically for a mini program user.

When the visualization production program has not received a user operation on a target basic UI element in the panel region 410, a blank canvas is displayed in the editing region 430, that is, an initial state of the editing region 430 is a blank canvas.

Step 302. Generate, in response to receiving an editing operation on a target basic UI element, a program interface of the mini program by editing, in the editing region, the target basic UI element.

In some embodiments, the editing operation includes a tap operation, a double-tap operation, a long press operation, a drag operation, and the like on the target basic UI element, and this is not limited in this application.

When an editing operation on a target basic UI element in the panel region 410 is received, the visualization production program obtains the program interface of the mini program by editing in the editing region 430 according to the target basic UI element, the target basic UI element being a UI element selected from n types of basic UI elements.

In some embodiments, the program interface of the mini program may be a static web page, that is, the program interface of the mini program is not capable of accessing a database in a backend server, and is displayed based on a client of the host application program.

An example in which the program interface of the mini program is a static web page is used. For example, as shown in FIG. 4(b), the visualization production program receives drag operations on the label UI element 411, the image UI element 413, and the horizontal list UI element 420, that is, the label UI element 411, the image UI element 413, and the horizontal list UI element 420 are target basic UI elements, and the visualization production program obtains a static program interface 440 of the mini program by editing according to the target basic UI elements.

As shown in the static program interface 440, a text part in the static program interface 440 is generated through editing after the drag operation is performed on the label UI element 411. An image part in the static program interface 440 is generated through editing after the drag operation is performed on the image UI element 413. A list control in the static program interface 440 is generated through editing after the drag operation is performed on the horizontal list UI element 420, the list control being a horizontal list composed of a list item 1, a list item 2, and a list item 3.

The static program interface 440 is a static web page, and a static program interface 440 actually presented is not capable of jumping to a page or accessing a database of a backend server or a local database.

In some embodiments, the program interface of the mini program may be a dynamic web page, that is, the program interface of the mini program can access a database of a backend server and interact with other pages.

An example in which the program interface of the mini program is a dynamic web page is used. For example, as shown in FIG. 4(c), the visualization production program receives drag operations on the label UI element 411, the image UI element 413, and the horizontal list UI element 420, that is, the label UI element 411, the image UI element 413, and the horizontal list UI element 420 are target basic UI elements, and the visualization production program obtains a dynamic program interface 450 of the mini program by editing according to the target basic UI elements.

As shown in the dynamic program interface 450, a text part in the dynamic program interface 450 is generated through editing after the drag operation is performed on the label UI element 411. An image part in the dynamic program interface 450 is generated through editing after the drag operation is performed on the image UI element 413. A list control in the dynamic program interface 450 is generated through editing after the drag operation is performed on the horizontal list UI element 420, the list control being a horizontal list composed of a list item 1, a list item 2, and a list item 3.

As shown in the dynamic program interface 450, a difference between the dynamic program interface 450 and the static program interface 440 is that, when the list item 1 in the horizontal list UI element 420 is tapped, the dynamic program interface 450 may jump to a program interface 460. The editing of the displayed program interface 460 is consistent with those of the static program interface 440 and the dynamic program interface 450, which all may be edited according to the basic UI elements in the panel region 410.

In addition, the program interface 460 may be alternatively one of a static web page and a dynamic web page.

Step 303. Generate a program package of the mini program according to the program interface.

When receiving editing operations on the target basic UI elements in the editing region, the visualization production program generates subprograms corresponding to the editing operations in the backend synchronously, and packages the subprograms into the program package of the mini program after completing the editing on the target basic UI elements. The program package is configured to run on the host application program.

In this embodiment of this application, when producing a mini program, a mini program production interface including a panel region and an editing region is displayed, and in response to receiving an editing operation on a target basic UI element, a program interface of the mini program is obtained by editing in the editing region according to the target basic UI element, and therefore, a program package of the mini program is generated according to the program interface of the mini program. Compared with development processes of related mini programs, by adopting the method provided in this application, a program related to a current operation may be generated fully and synchronously in the backend by receiving a visualization operation of a user who does not need to be a developer having strong research and development ability. Therefore, normal users may complete a visualization production of the mini program without manually editing code, thereby reducing the difficulty and improving the efficiency in the development of the mini program.

Figure 5:
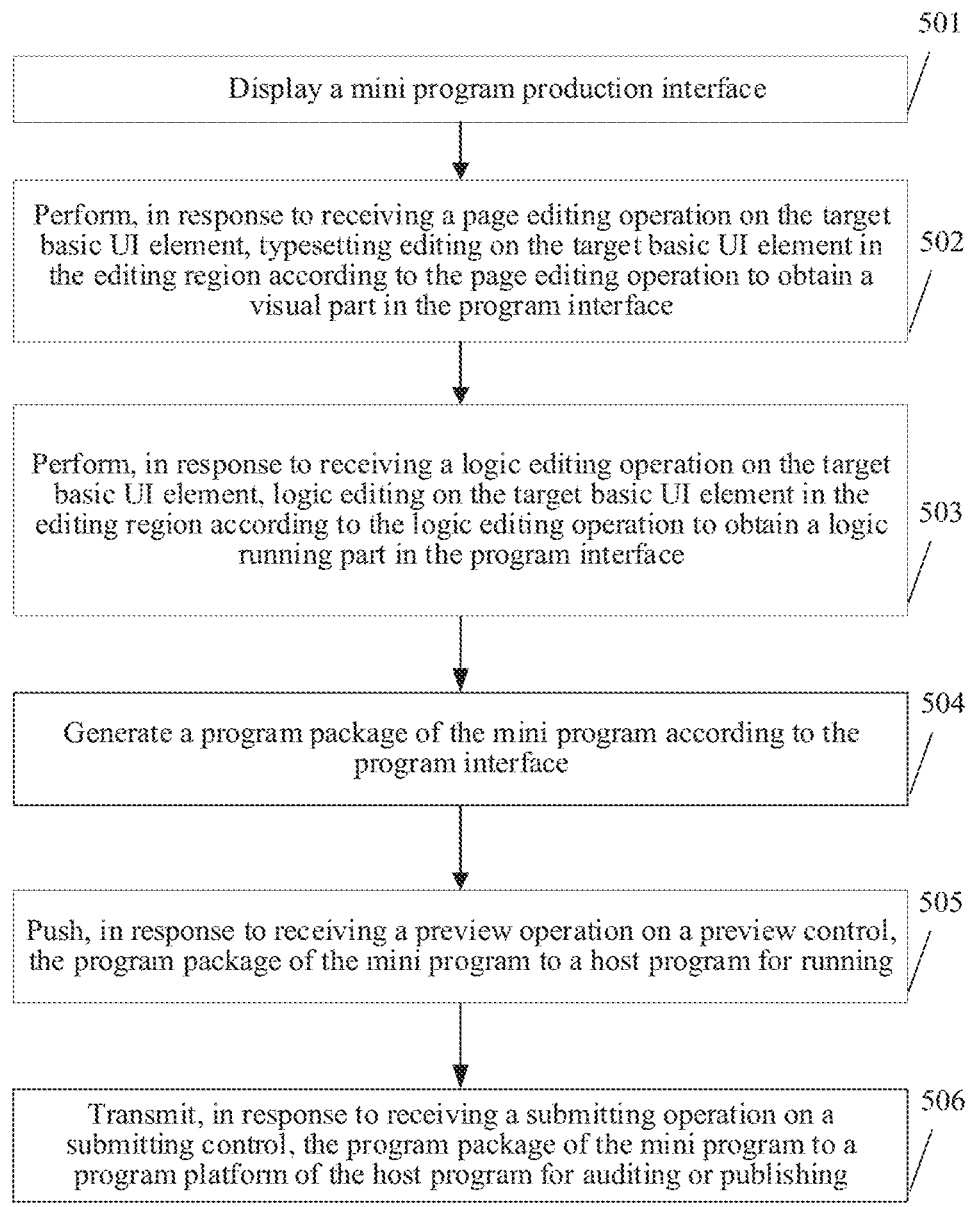
FIG. 5 is a flowchart of a mini program production method according to another exemplary embodiment of this application.

FIG. 5 is a flowchart of a mini program production method according to another exemplary embodiment of this application. An example in which the exemplary embodiment is performed by the first terminal 210 shown in FIG. 2 is used for description. The method includes the following steps.

Step 501. Display a mini program production interface.

For the implementation of this step, reference may be made to step 301, and details are not described again in this embodiment.

n types of basic UI elements include, but are not limited a label UI element, a button UI element, an image UI element, a single line input box UI element, a multi-line input box UI element, a single option UI element, a multi-option UI element, a time selection UI element, a status switch UI element, a horizontal list UI element, and a vertical list UI element.

Step 502. Perform, in response to receiving a page editing operation on the target basic UI element, typesetting editing on the target basic UI element in the editing region according to the page editing operation to obtain a visual part in the program interface.

In one implementation, the page editing operation corresponding to the target basic UI element includes determining a target basic UI element from the n types of basic UI elements, determining a position of the target basic UI element, determining a size of the target basic UI element, and the like. This is not limited in this embodiment of this application.

In one implementation, the visual part in the program interface includes the target basic UI element, the position of the target basic UI element in the program interface, the size of the target basic UI element in the program interface, and the like. This is not limited in this embodiment of this application.

In one implementation, this step includes the following steps.

Step 1. Add, in response to receiving a selection operation on the target basic UI element, the target basic UI element to the program interface of the mini program in the editing region according to the selection operation.

In some embodiments, the selection operation includes at least one of a tap selection operation and a drag selection operation.

The panel region of the visualization production program is provided with n types of basic UI elements. The visualization production program determines a basic UI element under the selection operation as a target basic UI element, and the target basic UI element is added to the program interface of the mini program by using a tap selection operation or a drag selection operation.

For example, as shown in FIG. 6(a), in the visualization production program, the mini program production interface 400 has received a drag selection operation on the image UI element 413 in the panel region 410, so as to add the image UI element 413 (that is, the target basic UI element) to a program interface 610 of the mini program in the editing region 430.

Step 2. Move, in response to receiving a movement operation on the target basic UI element, a position of the target basic UI element in the program interface of the mini program in the editing region according to the movement operation.

In some embodiments, when a user is not satisfied with an initial position of the target basic UI element in the program interface of the mini program, the user may drag the target basic UI element to a position in the program interface that the user is satisfied with by using a movement operation.

For example, as shown in FIG. 6(a), in the visualization production program, the mini program production interface 400 has received a movement operation on the image UI element 413 in a program interface 610, so as to move the image UI element 413 to a position indicated by an arrow.

Step 3. Change, in response to receiving a zooming operation on the target basic UI element, a size of the target basic UI element in the program interface of the mini program in the editing region according to the zooming operation.

In some embodiments, when a user is not satisfied with a size of the target basic UI element in the program interface of the mini program, the user may zoom the target basic UI element to a size that the user is satisfied with by using a zooming operation. The zooming operation includes a zoom-out operation and a zoom-in operation.

In some embodiments, the zooming operation may be a gesture operation (for example, bringing fingers closer to implement zoom-in, and bringing fingers farther to implement zoom-out), a control trigger operation (for example, zooming by tapping on a zoom control), or a data input operation (for example, implementing precise zooming by inputting size data).

For example, as shown in FIG. 6(c), in the visualization production program, the mini program production interface 400 has received a zoom-out operation on the image UI element 413 in the program interface 610, so as to zoom out the image UI element 413 according to a zoom-out range indicated by an arrow.

Because this embodiment of this application is performed based on a scenario in which the visualization production program is installed on a tablet computer, the foregoing selection operation, movement operation, and zooming operation may be implemented by touching a screen with fingers of a user.

In some embodiments, when a terminal on which the visualization production program is installed does not have a touch function, the foregoing selection operation, movement operation, and zooming operation may be implemented by using a keyboard and mouse.

Step 503. Perform, in response to receiving a logic editing operation on the target basic UI element, logic editing on the target basic UI element in the editing region according to the logic editing operation to obtain a logic running part in the program interface.

For a non-static web page, not only an interface display effect, that is, the visual part, of the mini program needs to be designed, but also an interface interaction logic of the program interface needs to be designed, that is, setting the logic running part. The interaction logic includes at least one of a data interaction logic and a page jumping logic.

In some embodiments, after step 502 of performing the typesetting editing on the target basic UI element to obtain the visual part of the mini program in the program interface is completed, logic editing is performed on the target basic UI element.

In one implementation, the logic editing operation corresponding to the target basic UI element includes a data interaction logic editing operation. The data interaction logic editing operation includes performing a data binding with static data, performing a data binding with dynamic data, performing a data binding with local data, and the like. This is not limited in this embodiment of this application.

In one implementation, this step includes the following steps.

Step 1. Perform, in response to receiving a first logic editing operation on the target basic UI element, data binding on the target basic UI element and static data in the editing region according to the first logic editing operation, the static data being data written into the target basic UI element in advance for display.

In response to receiving the first logic editing operation corresponding to the target basic UI element, the data binding is performed on the target basic UI element and the static data in the editing region according to the first logic editing operation, the static data being static display data written into the target basic UI element in advance for display. That is, attributes presented in a production stage of the mini program may be also understood as data written into the program inside when the visualization production program edits code in the backend synchronously.

When setting a specific display image of the image UI element, the specific display image is a type of static data. When setting specific text content of the label UI element and a filling color of the label UI element, each of the specific text content and the filling color is a type of static data.

Figure 6:
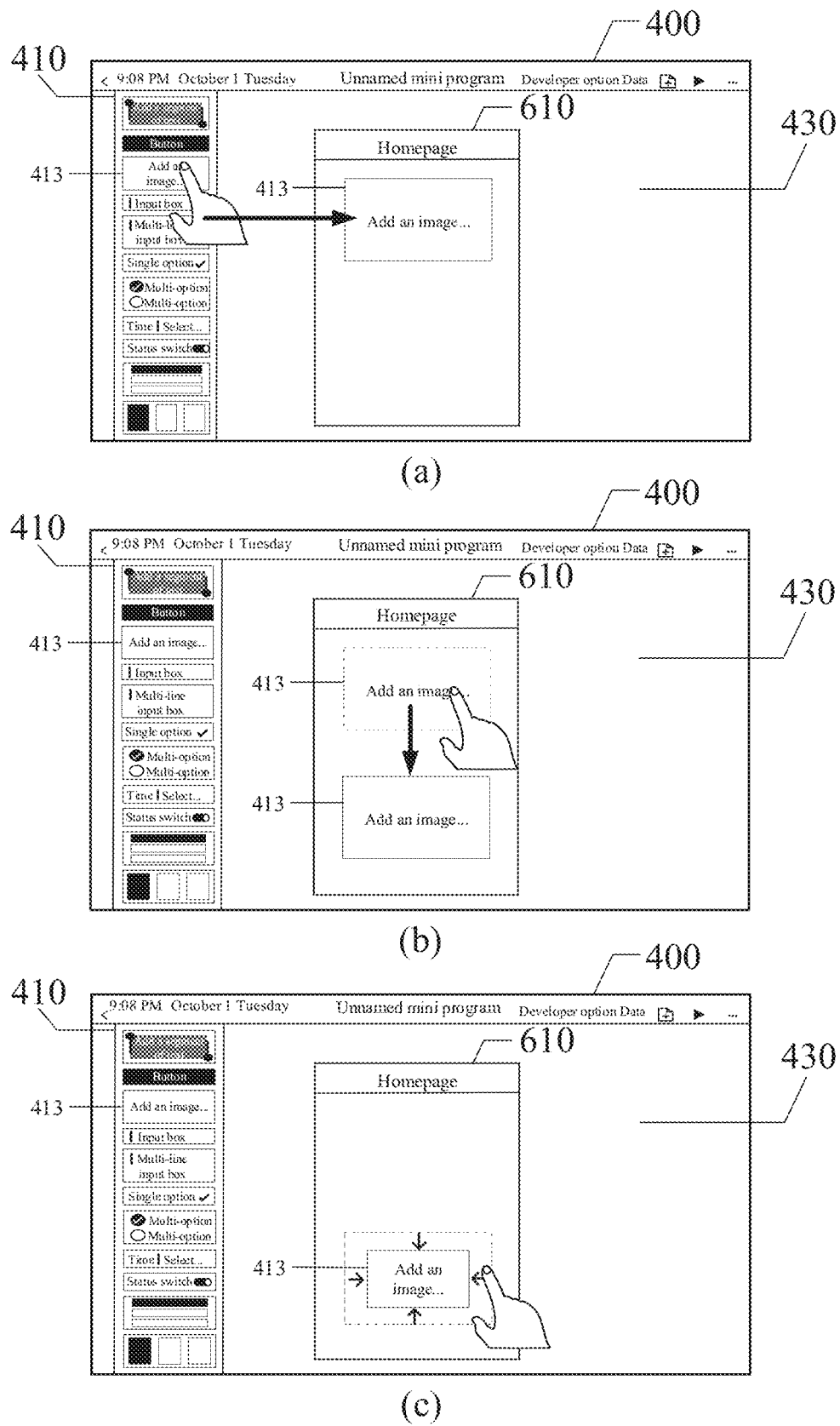
FIG. 6 is a schematic interface diagram of page editing of a mini program production interface according to an exemplary embodiment of this application.
Figure 7:
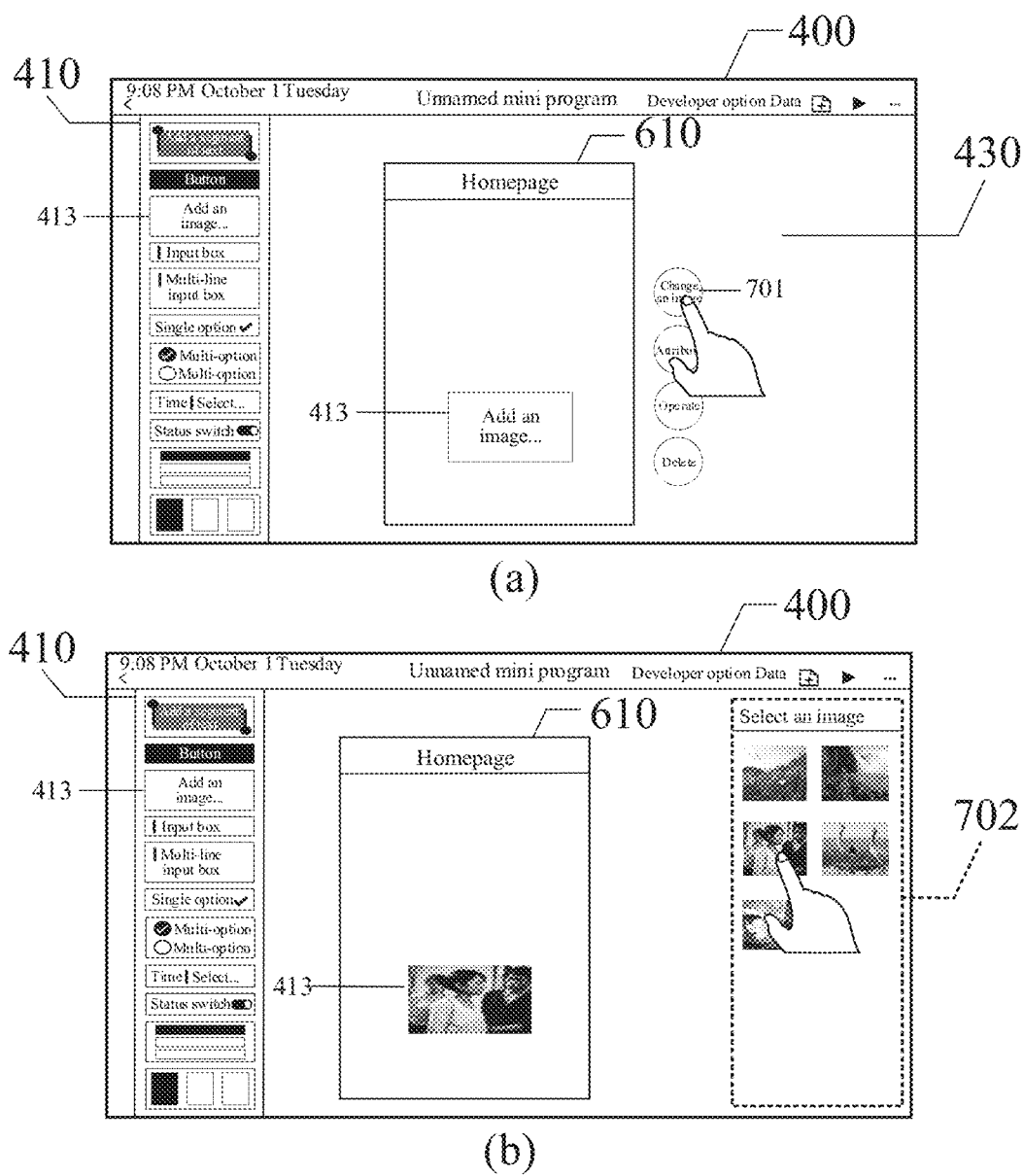
FIG. 7 is a schematic interface diagram of binding a target basic UI element and static data according to an exemplary embodiment of this application.

For example, based on FIG. 6(c), as shown in FIG. 7, in the visualization production program, after the typesetting editing shown in FIG. 6 is performed on the image UI element 413, the image UI element 413 may display an image-changing floating button 701 corresponding to the image UI element 413 on the mini program production interface 400 by receiving a tap operation on the image UI element 413, and display an image selection region 702 on the mini program production interface 400 after receiving a triggering operation of the user by using the image-changing floating button 701. Images displayed in the image selection region 702 are from a local album, and the user may select a target image (the static display data) that the user wants to add from the image selection region 702.

In one implementation, the execution order of step 502 and step "1" in step 503 may replace each other. That is, for the target basic UI element, the data binding with the static data may be performed first, and the typesetting editing may be performed subsequently.

Figure 8:
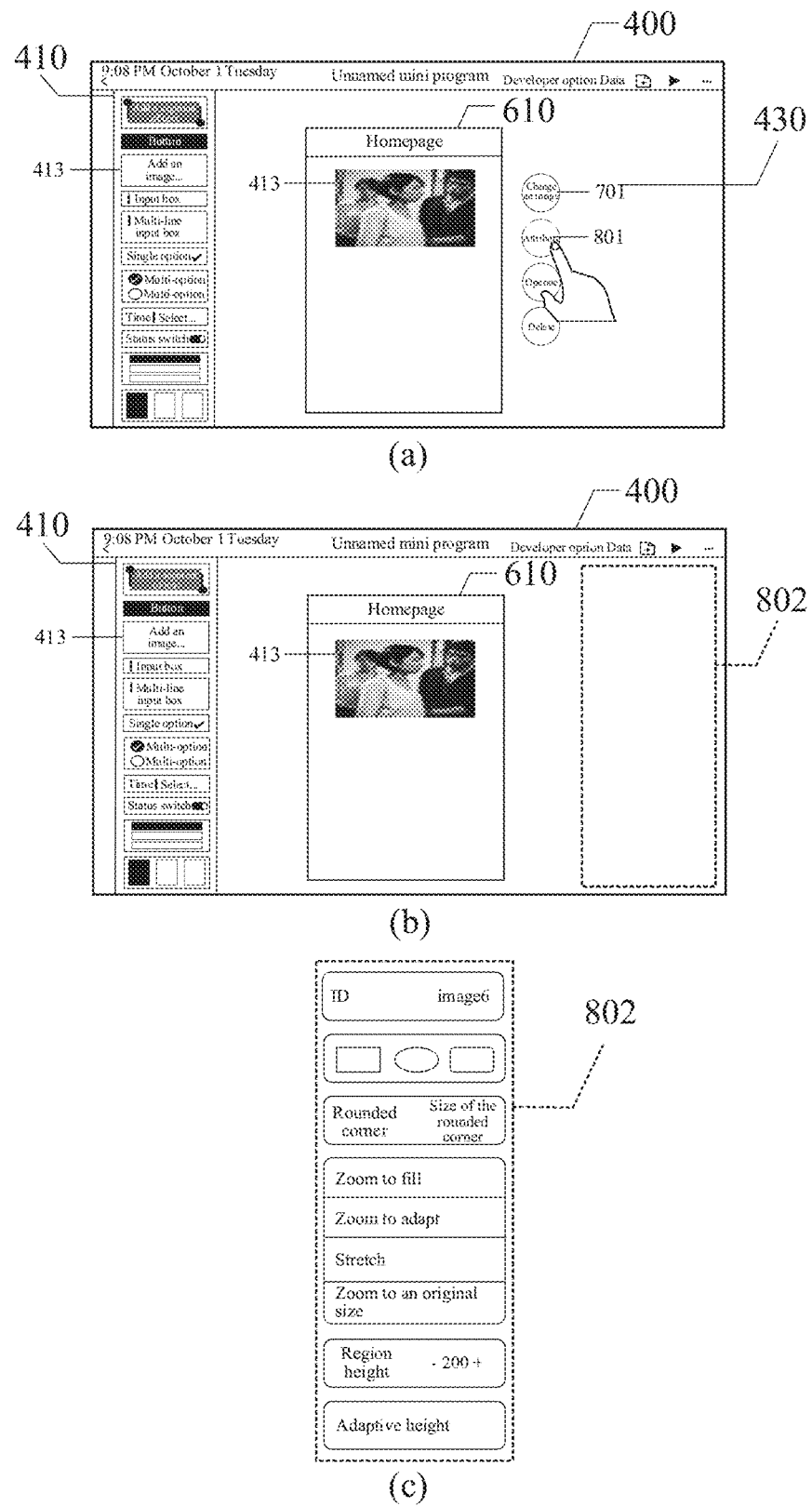
FIG. 8 is a schematic interface diagram of an attribute region in a target basic UI element according to an exemplary embodiment of this application.

For example, as shown in FIG. 8(a), data binding on the image UI element 413 and an image image6 (static data) is completed by using the image-changing floating button 701. In addition, as shown in FIG. 8(b), when the image UI element 413 receives a triggering operation on an attribute floating button 801, an attribute region 802 is displayed in the editing region 430 of the mini program production interface 400, the attribute region 802 being configured for receiving typesetting editing on the image UI element 413.

For example, FIG. 8(c) shows possible content included in the attribute region 802. For the image image6, a frame type (such as a rectangular frame, a rounded rectangular frame, and an elliptical frame), a zooming type (such as zoom to fill, zoom to adapt, stretch, and zoom to an original size), a region height, an adaptive height, and the like of the image image6 may be set by using the attribute region 802. The possible content included in the attribute region 802 is not limited in this embodiment of this application.

Different target basic UI elements correspond to different attribute regions, for example, an attribute region of a label UI element may implement settings about fonts, colors, and word sizes of text in the label UI element. Content included in different attribute regions of different target basic UI elements is not limited in this embodiment of this application.

Step 2. Perform, in response to receiving a second logic editing operation on the target basic UI element, data binding on the target basic UI element and first dynamic data in the editing region according to the second logic editing operation, the first dynamic data being data that is dynamically obtained by using a network protocol in a running process of the mini program and that is displayed in the target basic UI element.

In some embodiments, the second logic editing operation may be understood as that: when the mini program is run on a host application program, for the target basic UI element during the second logic editing operation preset in a production process of the mini program, a server may be dynamically accessed by using a network protocol, to obtain first dynamic data in the target basic UI element from the server and run and display the first dynamic data by using the host application program.

In the production process of the mini program, when the second logic editing operation corresponding to the target basic UI element is received, the data binding is performed on the target basic UI element and the first dynamic data in the editing region according to the second logic editing operation.

In an exemplary example, during the second logic editing operation, the mini program running on the host application program may dynamically update data and order related to list items in the horizontal list UI element. The data and order related to the list items is dynamic data, and the first dynamic data related to the list items needs to be obtained by accessing the server.

For example, as shown in FIG. 9(a), in the visualization production program, a program interface 910 of the mini program is displayed on the mini program production interface 400 according to the horizontal list UI element 420 in the panel region 410. The horizontal list UI element 420 includes 5 list items, which are respectively a list item 1, a list item 2, a list item 3, a list item 4, and a list item 5.

The list item 1 is a template item of the horizontal list UI element 420, and is configured for presenting a structure of each list item. For example, as shown in FIG. 9(b), the template item (that is, the list item 1) includes three data fields, namely, a first field 911, a second field 912, and a third field 913.

In a running process of the mini program, the program interface 910 including the horizontal list UI element 420 is displayed by obtaining the first dynamic data that may perform a field data binding with the list items. A process in which the list items and the first dynamic data are bound is described with reference to schematic drawings, and the process is second logic editing.

For example, as shown in FIG. 9(c), a quantity of the list items of the horizontal list UI element 420 may be set by using an attribute setting floating button 914 corresponding to the horizontal list UI element 420 in the mini program production interface 400. In addition, the first dynamic data of the list items of the horizontal list UI element 420 may be set by using a data binding floating button 915 corresponding to the horizontal list UI element 420 in the mini program production interface 400.

Figure 10:
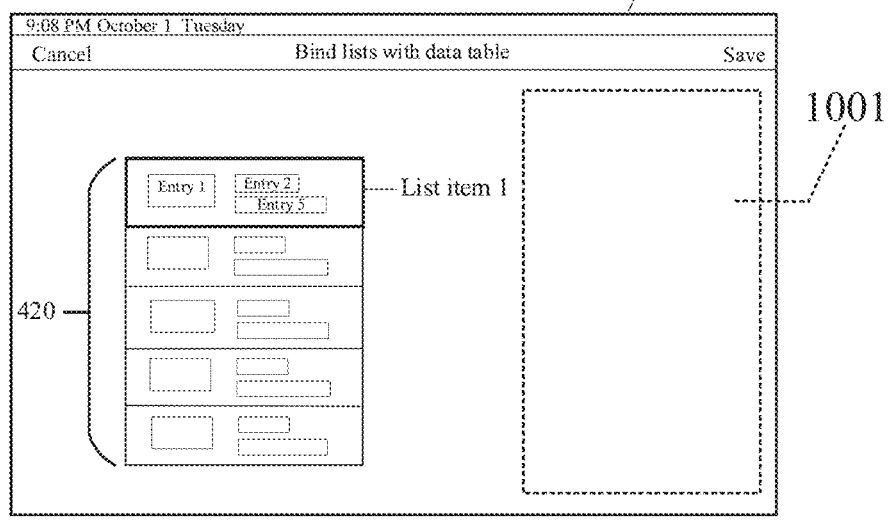
FIG. 10 is a schematic interface diagram of list item bound data according to an exemplary embodiment of this application.
Figure 10:
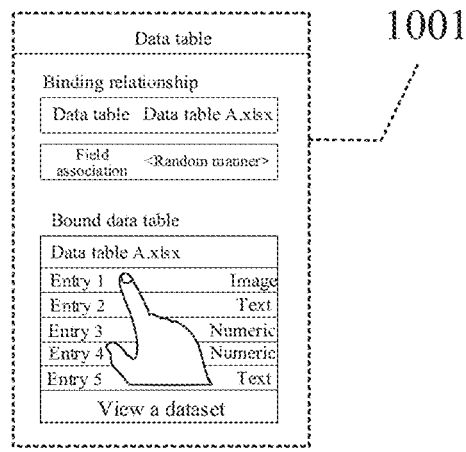

In one implementation, after the mini program production interface 400 receives a tap operation on the data binding floating button 915, an interface shown in FIG. 10 is displayed.

For example, as shown in FIG. 10(a), a data table A (such as a goods list) includes five columns of optional data, which are respectively an entry 1 (such as URL addresses of goods images), an entry 2 (such as goods names), an entry 3 (such as goods prices), an entry 4 (such as goods discounts), and an entry 5 (such as goods descriptions). For example, as shown in FIG. 10(b), the mini program production interface 400 displays an interface in which the lists and the data table are bound. The template item (that is, the list item 1) in the horizontal list UI element 420 includes the foregoing three fields. The three fields respectively select the entry 1, the entry 2, and the entry 5 in the data table A for data binding, and the selected entry 1, entry 2, and entry 5 are the first dynamic data. The first dynamic data of the template item may be selected by using a data region 1001 in the program interface. Through the foregoing data binding process, designated data in the data table may be displayed in the list items of the program interface (for example, the goods images, the goods names, and the goods descriptions are displayed in the list items).

For example, FIG. 10(c) shows possible content included in the data region 1001. For a scenario in which data binding is performed on the template item (that is, the list item 1) and the data table A, the data region 1001 includes: a bound object in a binding relationship, that is, the data table A: field association manner in the binding relationship; and data viewing, data editing, and data selection of the bound data table.

Figure 11:
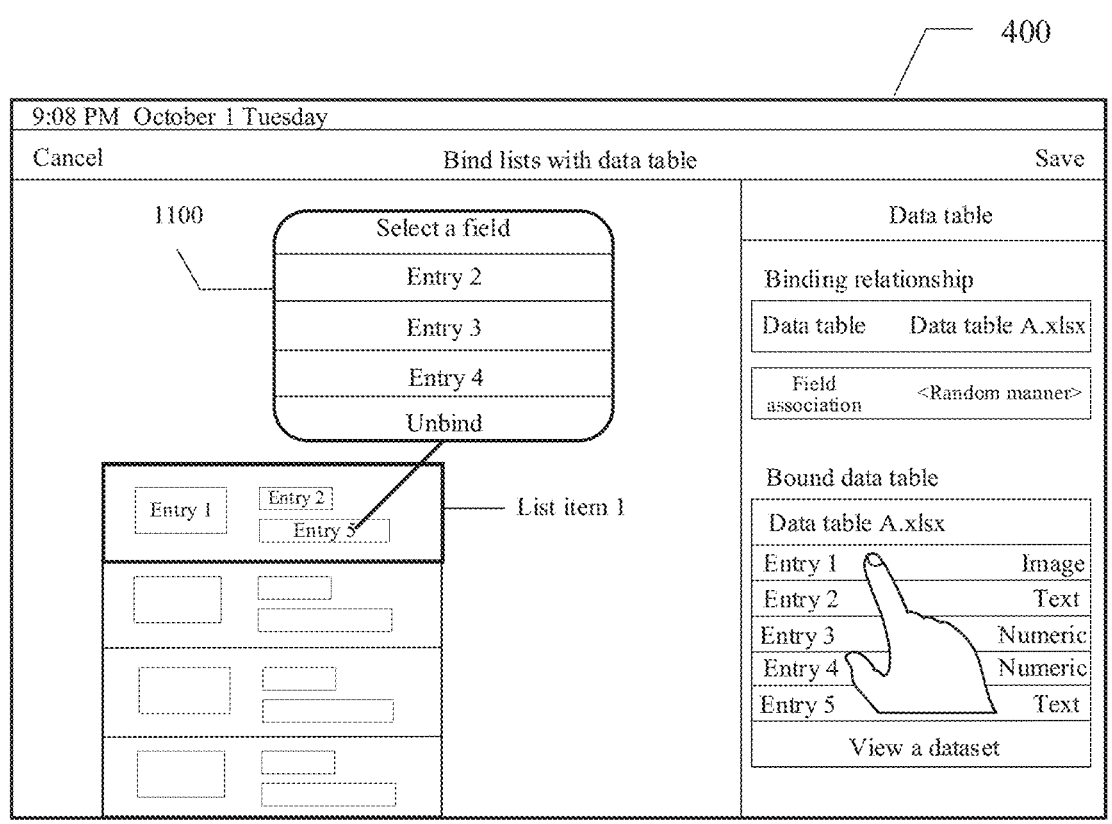
FIG. 11 is a schematic interface diagram of list item unbound data according to another exemplary embodiment of this application.

The field association is an association manner between a field in the template item and data selected from the data table, and the field association manner may be a random manner, or may be a designated manner. For example, as shown in FIG. 10(c), a current field association manner is a random manner. A user may perform data unbinding on a designated field when not satisfied with an association manner of the current field. In some embodiments, as shown in FIG. 11, the third field in the list item 1 is bound with data of the entry 5 in the data table A currently, and in a case of receiving a tap triggering operation on the third field, the production interface 400 displays a field unbinding option 1100 corresponding to the third field. The field unbinding option 1100 displays, according to a type of the third field, data with which the third field can be rebound currently, including the entry 2, the entry 3, and the entry 4.

After the data binding is performed on the template item, the mini program is run by using the host application program, and dynamically obtains first dynamic data of each list item in the target basic UI element by using a network protocol. Therefore, the host application program displays the program interface of mini program according to the first dynamic data.

When the data in the data table is updated, because the dynamic data obtained by the mini program changes, the data of the list items in the program interfaces may change accordingly.

Step 3. Perform, in response to receiving a third logic editing operation on the target basic UI element, data binding on the target basic UI element and second dynamic data in the editing region according to the third logic editing operation, the second dynamic data being data that is written after being calculated by using native code in a running process of the mini program and that is displayed in the target basic UI element.

In one implementation, the basic UI elements further include a basic UI element that may access a local terminal (installed with a host application program), and obtain second dynamic data of the local terminal.

In an exemplary example, the basic UI elements further include a positioning UI element. The positioning UI element is capable of accessing, when being triggered, positioning information of the local terminal installed with the host application program and obtaining the positioning information. The second dynamic data related to the positioning information is displayed on the program interface of the mini program.

In an exemplary example, the basic UI elements further include a UI element used for uploading local data to the mini program. The UI element is capable of accessing, when being triggered, local data of the local terminal installed with the host application program and obtaining target local data. The target local data is displayed on the program interface of the mini program.

Step 4. Perform, in response to receiving a fourth logic editing operation on the target basic UI element in the first program interface, data binding on the target basic UI element and the second program interface in the editing region according to the fourth logic editing operation, the second program interface being a program interface jumped to and displayed after the target basic UI element is triggered.

In one implementation, the program interface of the mini program in this application includes a first program interface and a second program interface that have a hierarchical display relationship. That is, during running of the mini program, the first program interface may be triggered to jump to the second program interface.

Figure 4:
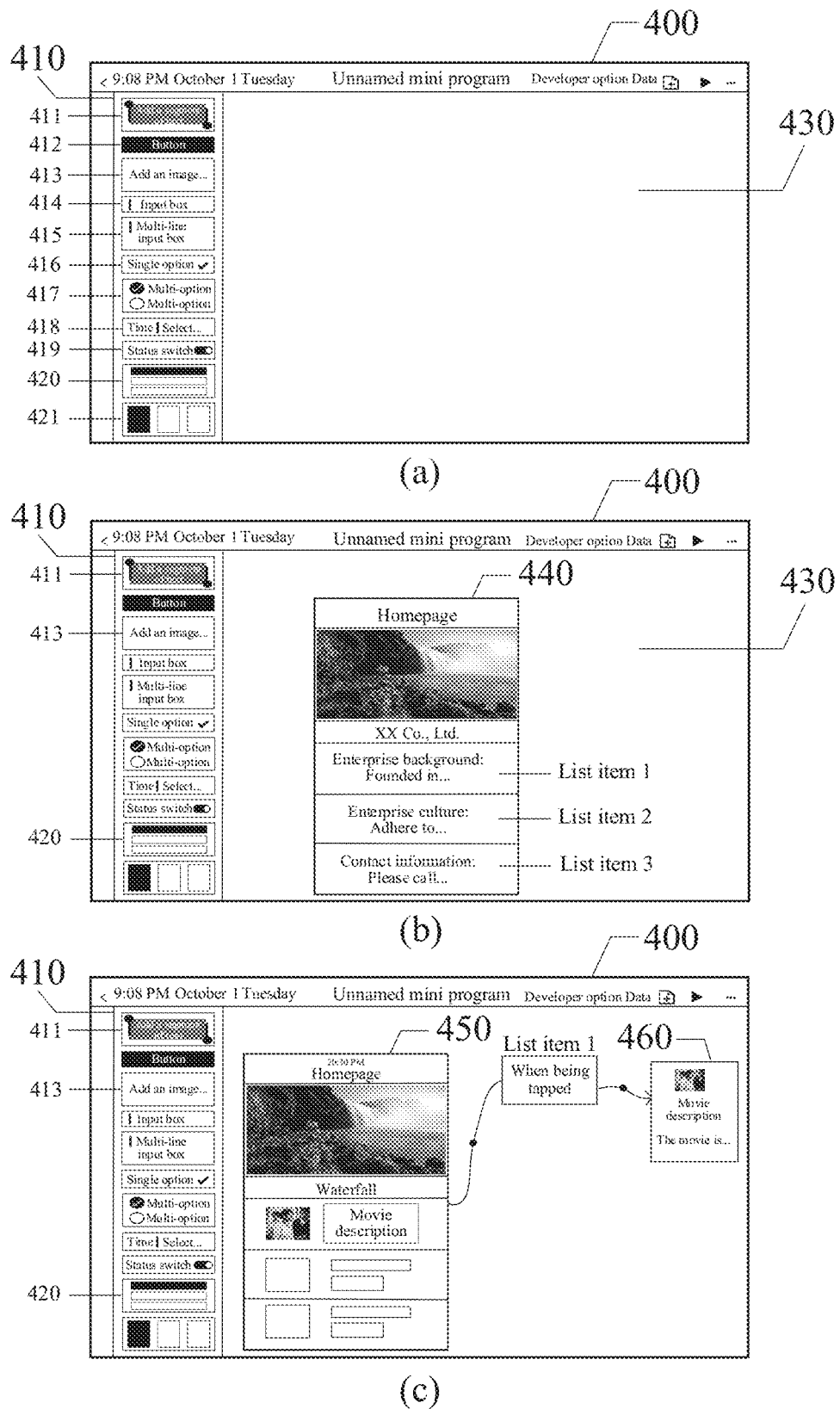
FIG. 4 is a schematic interface diagram of a mini program production interface according to an exemplary embodiment of this application.

In FIG. 4(*c*), the described dynamic web page is the first program interface. A process of implementing jumping from the first program interface to the second program interface is referred to as the fourth logic editing operation. Using FIG. 4(*c*) as an example for description, the fourth logic editing operation specifically is, after the page editing and the logic editing are performed on the program interface 460 (that is, the second program interface), performing data binding on the list item 1 in the dynamic program interface 450 (that is, the first program interface) and the program interface 460. Specifically, in a case of receiving a triggering operation on the list item 1, the program interface 460 jumps to the dynamic program interface 450.

Step 504. Generate a program package of the mini program according to the program interface.

For the implementation of this step, reference may be made to step 303, and details are not described again in this embodiment.

Step 505. Push, in response to receiving a preview operation on a preview control, the program package of the mini program to the host application program for running.

In one implementation, the mini program production interface further includes a preview control. When receiving a preview operation on the preview control, the visualization production program pushes the program package of the mini program to the host application program for running.

Figure 9:
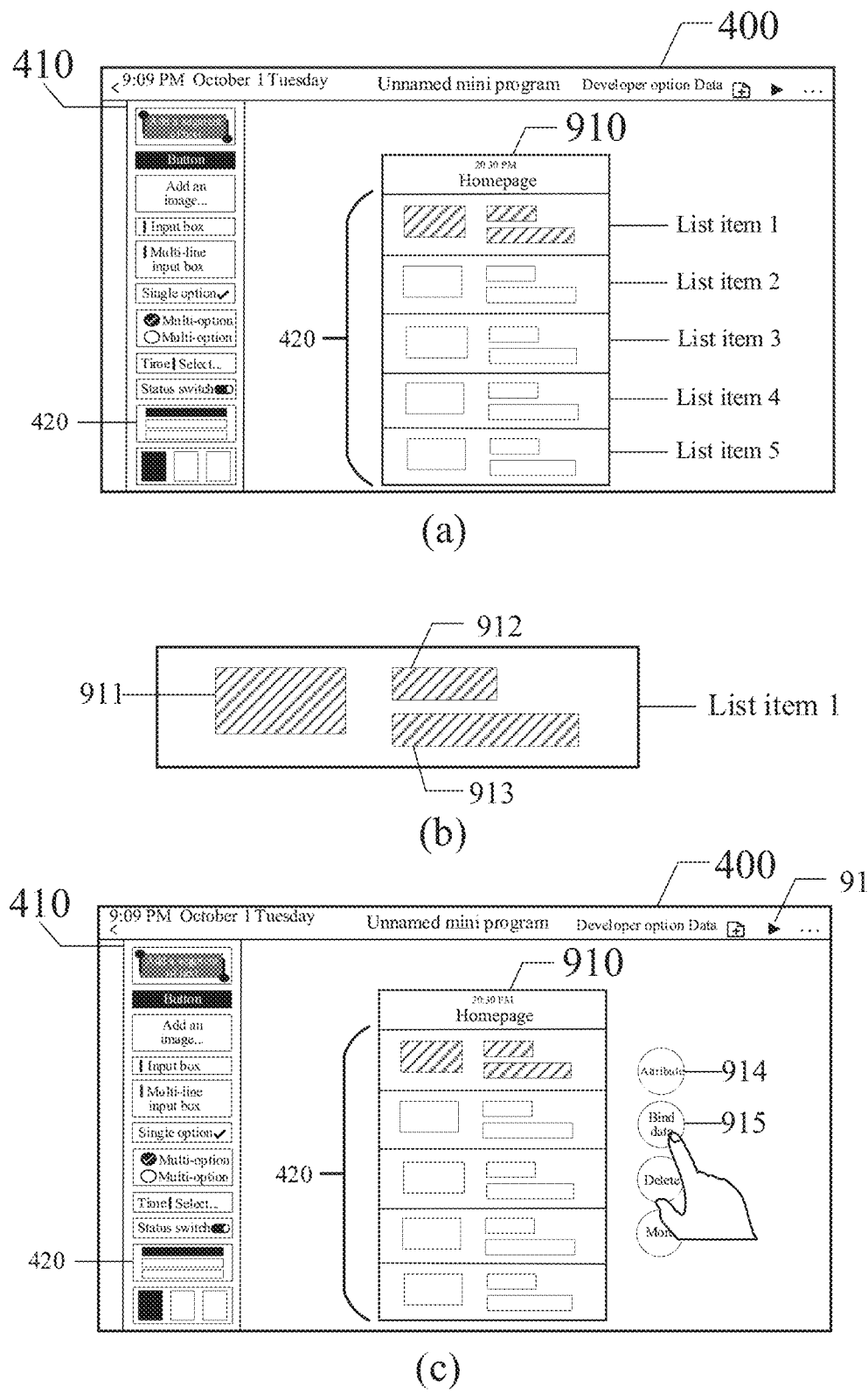
FIG. 9 is a schematic interface diagram of a mini program production interface according to another exemplary embodiment of this application.
Figure 12:
FIG. 12 is a schematic interface diagram of a mini program preview according to an exemplary embodiment of this application.

For example, based on FIG. 9 and FIG. 10, after the data binding is performed on the horizontal list UI element 420, previewing of the mini program may be implemented by using a preview control 916 in the mini program production interface 400. A final preview effect is shown in FIG. 12, and data bound with the field in each list item is from the data table A shown in FIG. 10(*a*).

In one implementation, the mini program production interface further includes a preview control, and the visualization production program and the host application program are installed on the same terminal. When the visualization production program receives a preview operation on the preview control, the visualization production program transmits the program package of the mini program to the host application program.

In another possible implementation, the visualization production program is a host application program having a mini program production function, and in a case of receiving the preview operation on the preview control, the host application program loads a generated program package.

Step 506. Transmit, in response to receiving a submitting operation on a submitting control, the program package of the mini program to a program platform of the host application program for auditing or publishing.

After the mini program is produced, whether the mini program meets requirements of the program platform of the host application program is considered. For example, a mini program including illegal or inappropriate content is rejected for publishing by the program platform.

In one implementation, the mini program production interface further includes a submitting control. When receiving a submitting operation on the submitting control, the visualization production program pushes the program package of the mini program to a program platform corresponding to the host application program, and then the program platform audits the mini program manually or automatically.

In this embodiment of this application, the program interface of the mini program includes a visual part and a logic running part. The visual part is obtained according to a page editing operation, and the visualization production program performs typesetting editing on a target basic UI element according to the page editing operation. The logic running part is obtained according to a logic editing operation, and the visualization production program performs logic editing on a target basic UI element according to the logic editing operation, to generate data binding and interface jumping logic code in the program interface of the mini program. In addition to having good interface display effects, the mini program generated by using the foregoing operations further has good interactivity, which helps to improve the quality of the mini program.

In the foregoing embodiments, code related to the operations related to the mini program production may be generated synchronously in the backend of the visualization production program. For example, in a case of determining a target basic UI element, completing a page editing operation, and completing a logic editing operation, the visualization production program generates code related to a current operation synchronously.

In some embodiments, in a process of involving some complex page logics, some developers having basic knowledge of code writing usually need to input code manually based on a visualization operation. In one implementation, in response to a preset editing operation on a target basic UI element in an editing region, mini program code corresponding to the target basic UI element is displayed in a code display region of the editing region, and in response to receiving an encoding operation on the mini program code in the code display region, the mini program code corresponding to the target basic UI element is updated according to the encoding operation. The preset editing operation may be a long press operation, a double-tap operation, a press operation, and the like. This is not limited in this embodiment.

For example, as shown in FIG. 13(a), a code display region 1301 is displayed on the mini program production interface 400, and when a double-tap operation on a program interface 1300 in the editing region is received, code is generated in the code display region 1301 synchronously.

In addition, a user may alternatively edit the code in the code display region 1301, that is, a visualization production mini program is transformed into a code writing production mini program.

When performing the code editing in the code display region 1301, if the user operates according to related code editing methods, the user needs to know identity (ID) of each target basic UI element, so as to type an ID of the currently edited target basic UI element into the edited code. If the user does not know the ID of each target basic UI element, the user may have difficulty in code editing.

In one implementation, in a case of receiving a triggering operation of the user on a target basic UI element, the visualization production program obtains an ID of the target basic UI element, and the ID of the target basic UI element is typed into the code display region 1301 automatically. That is, the ID of the currently edited target basic UI element is automatically typed into a line of code into which the ID needs to be typed, which provides convenience for the users having a certain code editing ability.

In some embodiments, before the triggering operation of the user on the target basic UI element is received, a triggering operation on a code region into which an ID needs to be typed further needs to be received. In some embodiments, the triggering operation on the target basic UI element includes a tap operation, a double-tap operation, and the like on the target basic UI element, and this is not limited in this embodiment of this application.

For example, as shown in FIG. 13(b), in the code display region 1301, content needs to be typed into a variation region 1302 is an ID of a current target basic UI element, that is, an ID of the image UI element 413. After a tap operation of the user on the variation region 1302 is received, a tap operation of the user on the target basic UI element is waited to be received. After receiving the tap operation of the user on the image UI element 413 in the program interface 1300, the visualization production program obtains an ID of the image UI element, and the ID of the image UI element 413 is automatically typed into and displayed in the variation region 1302. Therefore, the user does not need to type the ID of the image UI element 413 into the variation region 1302 manually.

The visualization production program generates code related to a current operation in the backend synchronously, and therefore, normal users may also perform a mini program production by using the visualization production program. In addition, users having a certain code editing ability may also edit code by using the foregoing code display region, thereby improving the flexibility of the mini program production.

Figure 14:
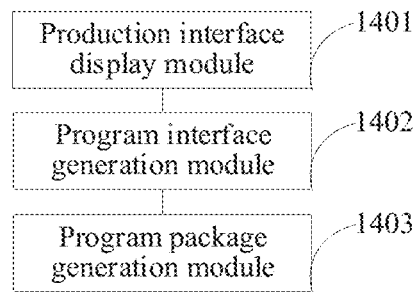
FIG. 14 is a structural block diagram of a mini program production apparatus according to an exemplary embodiment of this application.

FIG. 14 is a structural block diagram of a mini program production apparatus according to an embodiment of this application. The apparatus may be implemented as an entire computer device or a part of the computer device by using software, hardware, or a combination thereof. The apparatus includes:

a production interface display module 1401, configured to display a mini program production interface, a panel region and an editing region being displayed on the mini program production interface, the panel region being provided with n types of basic UI elements, n being a positive integer:

a program interface generation module 1402, configured to obtain, in response to receiving an editing operation on a target basic UI element, a program interface of the mini program by editing in the editing region according to the target basic UI element, the target basic UI element being a UI element selected from the n types of basic UI elements; and a program package generation module 1403, configured to generate a program package of the mini program according to the program interface.

In some embodiments, the program interface generation module 1402 includes:

a typesetting editing submodule, configured to perform, in response to receiving a page editing operation on the target basic UI element, typesetting editing on the target basic UI element in the editing region according to the page editing operation to obtain a visual part in the program interface; and a logic editing submodule, configured to perform, in response to receiving a logic editing operation on the target basic UI element, logic editing on the target basic UI element in the editing region according to the logic editing operation to obtain a logic running part in the program interface.

In some embodiments, the typesetting editing submodule is configured to add, in response to receiving a selection operation on the target basic UI element, the target basic UI element to the program interface according to the selection operation;

move, in response to receiving a movement operation on the target basic UI element, a position of the target basic UI element in the program interface according to the movement operation; and change, in response to receiving a zooming operation on the target basic UI element, a size of the target basic UI element in the program interface according to the zooming operation.

In some embodiments, the logic editing submodule is configured to perform, in response to receiving a first logic editing operation on the target basic UI element, data binding on the target basic UI element and static data in the editing region according to the first logic editing operation, the static data being data written into the target basic UI element in advance for display;

perform, in response to receiving a second logic editing operation on the target basic UI element, data binding on the target basic UI element and first dynamic data in the editing region according to the second logic editing operation, the first dynamic data being data that is dynamically obtained by using a network protocol in a running process of the mini program and that is displayed in the target basic UI element; and perform, in response to receiving a third logic editing operation on the target basic UI element, data binding on the target basic UI element and second dynamic data in the editing region according to the third logic editing operation, the second dynamic data being data that is written after being calculated by using native code in a running process of the mini program and that is displayed in the target basic UI element.

In some embodiments, the apparatus further includes a decoding module, configured to perform, in response to receiving an unbinding operation on the target basic UI element, data unbinding on data corresponding to the target basic UI element according to the unbinding operation.

In some embodiments, the program interface of the mini program includes a first program interface and a second program interface that have a hierarchical display relationship.

In some embodiments, the logic editing submodule is configured to perform, in response to receiving a fourth logic editing operation on the target basic UI element in the first program interface, data binding on the target basic UI element and the second program interface in the editing region according to the fourth logic editing operation, the second program interface being a program interface jumped to and displayed after the target basic UI element is triggered.

In some embodiments, the apparatus further includes:
a code display module, configured to display, in response to a preset triggering operation on the target basic UI element in the editing region, mini program code corresponding to the target basic UI element in a code display region of the editing region; and
a code updating module, configured to update, in response to receiving an encoding operation on the mini program code in the code display region, the mini program code corresponding to the target basic UI element according to the encoding operation.

In some embodiments, the mini program production interface further includes a preview control.

In some embodiments, the apparatus further includes:
a program package pushing module, configured to push, in response to receiving a preview operation on the preview control, the program package of the mini program to a host application program for running.

In some embodiments, the mini program production interface further includes a submitting control.

In some embodiments, the apparatus further includes:
a program package transmission module, configured to transmit, in response to receiving a submitting operation on the submitting control, the program package of the mini program to the program platform of the host application program for auditing or publishing.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 15:
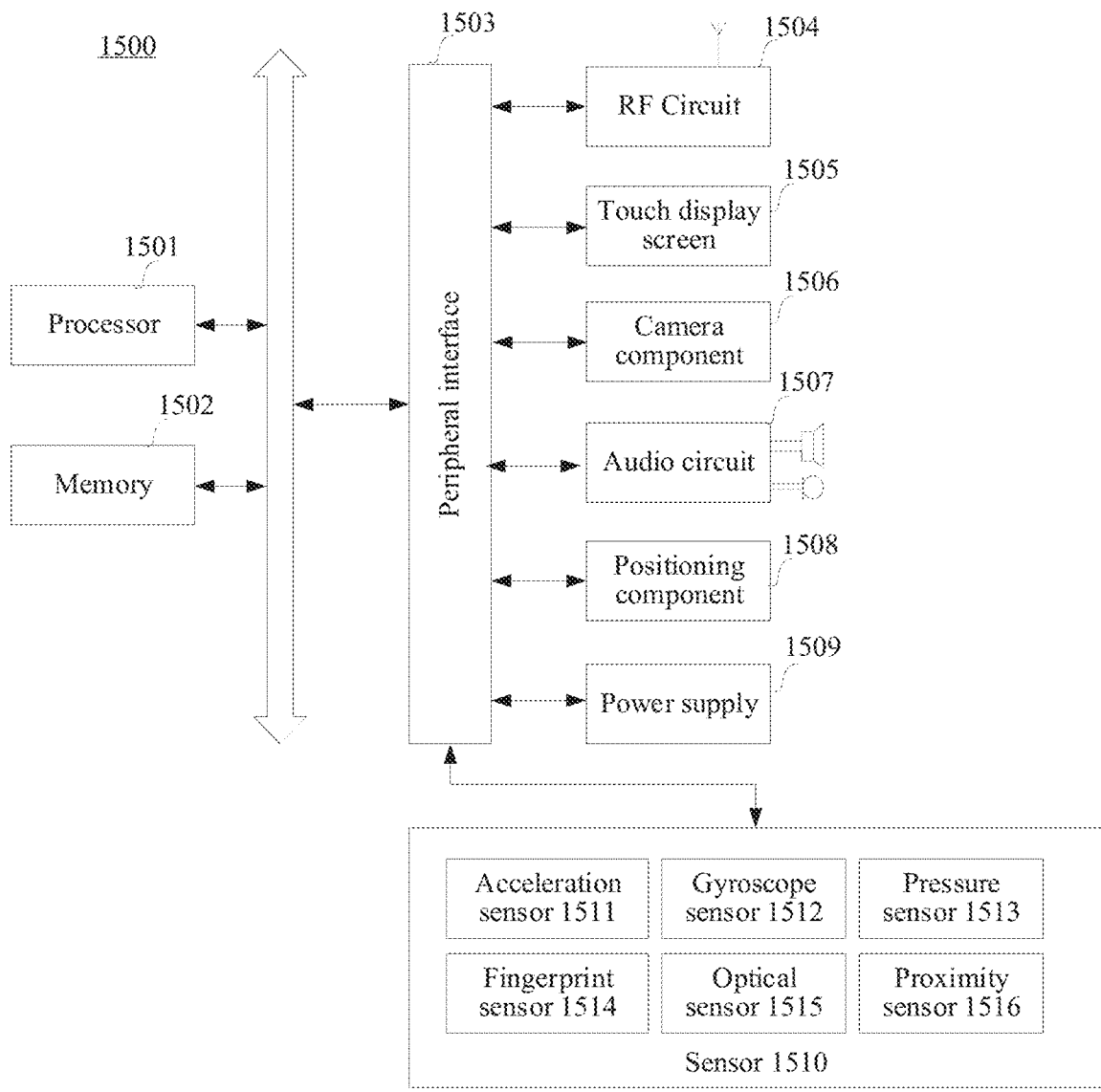
FIG. 15 is a structural block diagram of a terminal according to an exemplary embodiment of this application.

FIG. 15 is a structural block diagram of a terminal 1500 according to an exemplary embodiment of this application. The terminal 1500 may be a portable mobile terminal, for example, a smartphone, a tablet computer, a moving picture experts group audio layer III (MP3) player, or a moving picture experts group audio layer IV (MP4) player. The terminal 1500 may be further referred to as other names such as user equipment and a portable terminal.

Generally, the terminal 1500 includes a processor 1501 and a memory 1502.

The processor 1501 may include one or more processing cores, for example, a 4-core processor or an 8-core processor. The processor 1501 may be implemented in at least one hardware form of a digital signal processor (DSP), a field-programmable gate array (FPGA), and a programmable logic array (PLA). The processor 1501 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1501 may be integrated with a graphics processing unit (GPU). The GPU is configured to render and draw content that needs to be displayed on a display screen. In some embodiments, the processor 1501 may further include an artificial intelligence (AI) processor. The AI processor is configured to process computing operations related to machine learning.

The memory 1502 may include one or more computer-readable storage media. The computer-readable storage medium may be tangible and non-transient. The memory 1502 may further include a high-speed random access memory and a nonvolatile memory, for example, one or more disk storage devices or flash storage devices. In some embodiments, a non-transitory computer-readable storage medium in the memory 1502 is configured to store at least one instruction, the at least one instruction being configured to be executed by the processor 1501 to implement the mini program production method of the terminal 1500 provided in this application.

In some embodiments, the terminal 1500 may optionally include: a peripheral interface 1503 and at least one peripheral. Specifically, the peripheral includes: at least one of a radio frequency (RF) circuit 1504, a touch display screen 1505, a camera component 1506, an audio circuit 1507, a positioning component 1508, and a power supply 1509.

The peripheral interface 1503 may be configured to connect the at least one peripheral related to input/output (I/O) to the processor 1501 and the memory 1502. In some embodiments, the processor 1501, the memory 1502 and the peripheral device interface 1503 are integrated on a same chip or circuit board. In some other embodiments, any one or two of the processor 1501, the memory 1502, and the peripheral device interface 1503 may be implemented on a single chip or circuit board. This is not limited in this embodiment.

The RF circuit 1504 is configured to receive and transmit an RF signal, also referred to as an electromagnetic signal. The RF circuit 1504 communicates with a communication network and other communication devices through the electromagnetic signal. The RF circuit 1504 converts an electrical signal into an electromagnetic signal for transmission, or converts a received electromagnetic signal into an electrical signal. In some embodiments, the RF circuit 1504 includes, an antenna system, an RF transceiver, one or more amplifiers, a tuner, an oscillator, a digital signal processor, a codec chip set, a subscriber identity module card, and the like. The RF circuit 1504 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF 1504 may further include a circuit related to NFC, which is not limited in this application.

The touch display screen 1505 is configured to display a UI. The UI may include a graph, text, an icon, a video, and any combination thereof. The touch display screen 1505 also has a capability of acquiring a touch signal on or above a surface of the touch display screen 1505. The touch signal may be inputted to the processor 1501 as a control signal for processing. The touch display screen 1505 is configured to provide a virtual button and/or a virtual keyboard, which is also referred to as a soft button and/or a soft keyboard. In some embodiments, there may be one touch display screen 1505, disposed on a front panel of the terminal 1500. In some other embodiments, there may be at least two touch display screens 1505, disposed on different surfaces of the terminal 1500 respectively or in a folded design. In some embodiments, the touch display screen 1505 may be a flexible display screen, disposed on a curved surface or a folded surface of the terminal 1500. Even, the touch display screen 1505 may be further set in a non-rectangular irregular pattern, namely, a special-shaped screen. The touch display screen 1505 may be made of a material such as a liquid crystal display (LCD) or an organic light-emitting diode (OLED).

The camera component 1506 is configured to collect images or videos. In some embodiments, the camera component 1506 includes a front-facing camera and a rear-facing camera. Generally, the front-facing camera is configured to implement a video call or self-portrait. The rear-facing camera is configured to capturing an image or a video. In some embodiments, there are at least two rear-facing cameras, each of which is any one of a main camera, a depth of field camera, and a wide-angle camera, to implement a background blurring function by fusing the main camera and the depth of field camera, and panoramic shooting and virtual reality (VR) shooting functions by fusing the main camera and the wide-angle camera. In some embodiments, the camera component 1506 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1507 is configured to provide an audio interface between a user and the terminal 1500. The audio circuit 1507 may include a microphone and a speaker. The microphone is configured to collect sound waves of a user and an environment, and convert the sound waves into an electrical signal to input to the processor 1501 for processing, or input to the radio frequency circuit 1504 for implementing voice communication. For the purpose of stereo collection or noise reduction, there may be a plurality of microphones, disposed at different portions of the terminal 1500 respectively. The microphone may further be an array microphone or an omni-directional collection type microphone. The speaker is configured to convert electric signals from the processor 1501 or the RF circuit 1504 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1507 may also include an earphone jack.

The positioning component 1508 is configured to determine a current geographic location of the terminal 1500, to implement a navigation or a location based service (LBS). The positioning component 1508 may be a positioning component based on the global positioning system (GPS) of the United States, the BeiDou System of China, and the GALILEO System of Russia.

The power supply 1509 is configured to supply power to components in the terminal 1500. The power supply 150') may be an alternating-current power supply, a direct-current power supply, a disposable battery, or a rechargeable battery. When the power supply 1509 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1500 may further include one or more sensors 1510. The one or more sensors 1510 include, but are not limited to: an acceleration sensor 1511, a gyroscope sensor 1512, a pressure sensor 1513, a fingerprint sensor 1514, an optical sensor 1515, and a proximity sensor 1516.

The acceleration sensor 1511 may detect a magnitude of acceleration on three coordinate axes of a coordinate system established by the terminal 1500. For example, the acceleration sensor 1511 may be configured to detect components of gravity acceleration on the three coordinate axes. The processor 1501 may control, according to a gravity acceleration signal collected by the acceleration sensor 1511, the touch display screen 1505 to display the UI in a frame view or a portrait view. The acceleration sensor 1511 may be further configured to collect motion data of a game or a user.

The gyroscope sensor 1512 may detect a body direction and a rotation angle of the terminal 1500. The gyroscope sensor 1512 may cooperate with the acceleration sensor 1511 to collect a 3D action by the user on the terminal 1500. The processor 1501 may implement the following functions according to data acquired by the gyroscope sensor 1512: motion sensing (for example, the UI is changed according to a tilt operation of a user), image stabilization during shooting, game control, and inertial navigation.

The pressure sensor 1513 may be disposed at a side frame of the terminal 1500 and/or a lower layer of the touch display screen 1505. When the pressure sensor 1513 is disposed at the side frame of the terminal 1500, a holding signal of the user on the terminal 1500 may be detected, and left/right hand identification and a quick action may be performed according to the holding signal. When the pressure sensor 1513 is disposed at the lower layer of the touch display screen 1505, an operable control on the UI interface can be controlled according to a pressure operation of the user on the touch display screen 1505. The operable control includes at least one of a button control, a scroll-bar control, an icon control, and a menu control.

The fingerprint sensor 1514 is configured to acquire a user's fingerprint to identify a user's identity according to the acquired fingerprint. When identifying that the user's identity is a trusted identity, the processor 1501 authorizes the user to perform related sensitive operations. The sensitive operations include: unlocking a screen, viewing encrypted information, downloading software, paying, changing a setting, and the like. The fingerprint sensor 1514 may be disposed on a front surface, a back surface, or a side surface of the terminal 1500. When a physical button or a vendor logo is disposed on the terminal 1500, the fingerprint sensor 1514 may be integrated with the physical button or the vendor logo.

The optical sensor 1515 is configured to collect ambient light intensity. In an embodiment, the processor 1501 may control the display luminance of the touch display screen 1505 according to the ambient light intensity collected by the optical sensor 1515. Specifically, when the ambient light intensity is relatively high, the display luminance of the touch display screen 1505 is increased. When the ambient light intensity is relatively low, the display luminance of the touch display screen 1505 is decreased. In another embodiment, the processor 1501 may further dynamically adjust a camera parameter of the camera component 1506 according to the ambient light intensity collected by the optical sensor 1515.

The proximity sensor 1516, also referred to as a distance sensor, is generally disposed on the front surface of the terminal 1500. The proximity sensor 1516 is configured to acquire a distance between the user and the front surface of the terminal 1500. In an embodiment, when the proximity sensor 1516 detects that the distance between the user and the front surface of the terminal 1500 gradually becomes small, the touch display screen 1505 is controlled by the processor 1501 to switch from a screen-on state to a screen-off state. When the proximity sensor 1516 detects that the distance between the user and the front surface of the terminal 1500 gradually increases, the touch display screen 1501 is controlled by the processor 1505 to switch from the screen-off state to the screen-on state.

Figure 13:
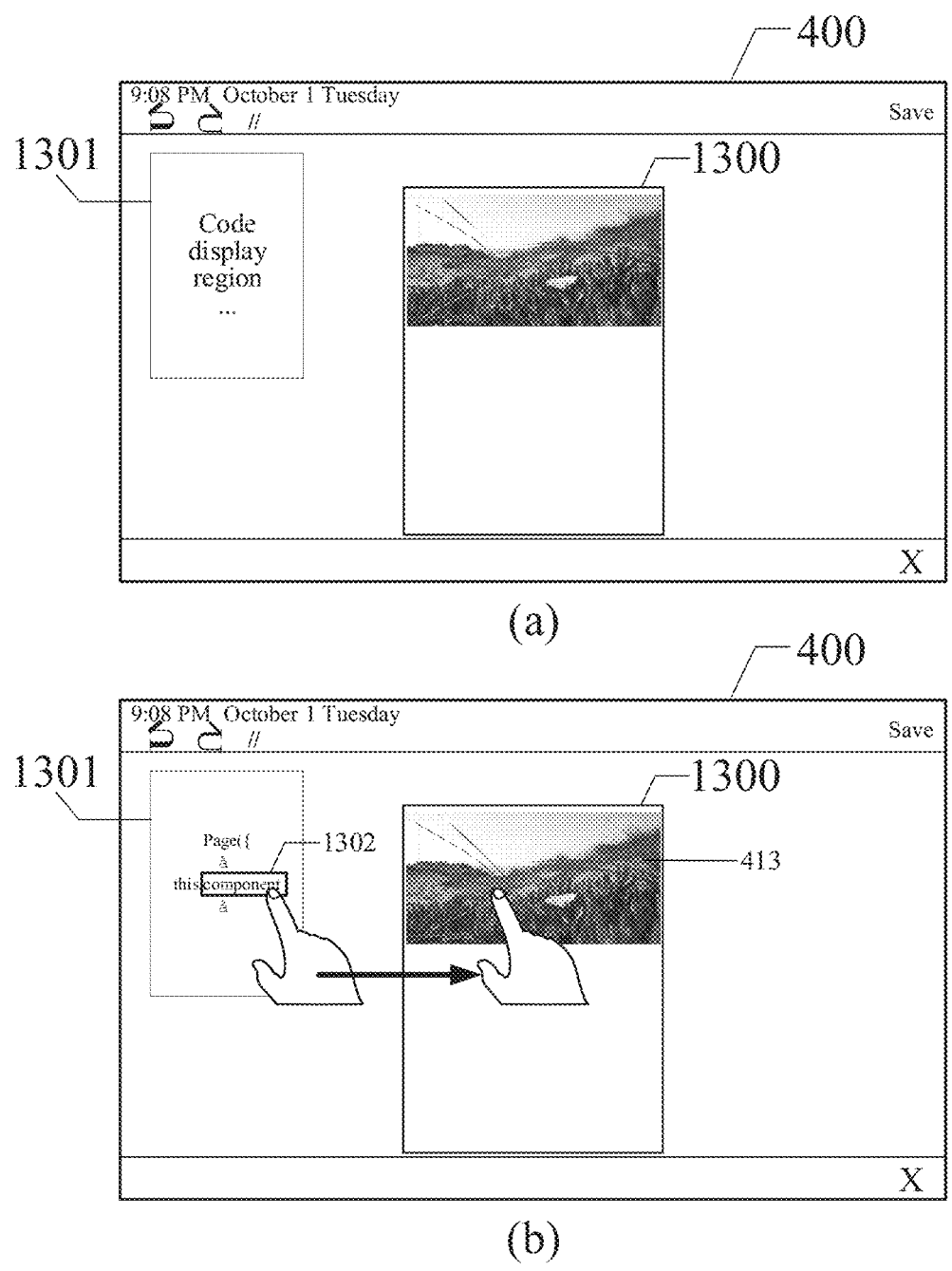
FIG. 13 is a schematic interface diagram of a mini program production interface generating code synchronously according to an exemplary embodiment of this application.

A person skilled in the art may understand that the structure shown in FIG. 13 does not constitute a limitation to the terminal 1500, and the terminal may include more or fewer components than those shown in the figure, or some components may be combined, or a different component arrangement may be used.

Figure 16:
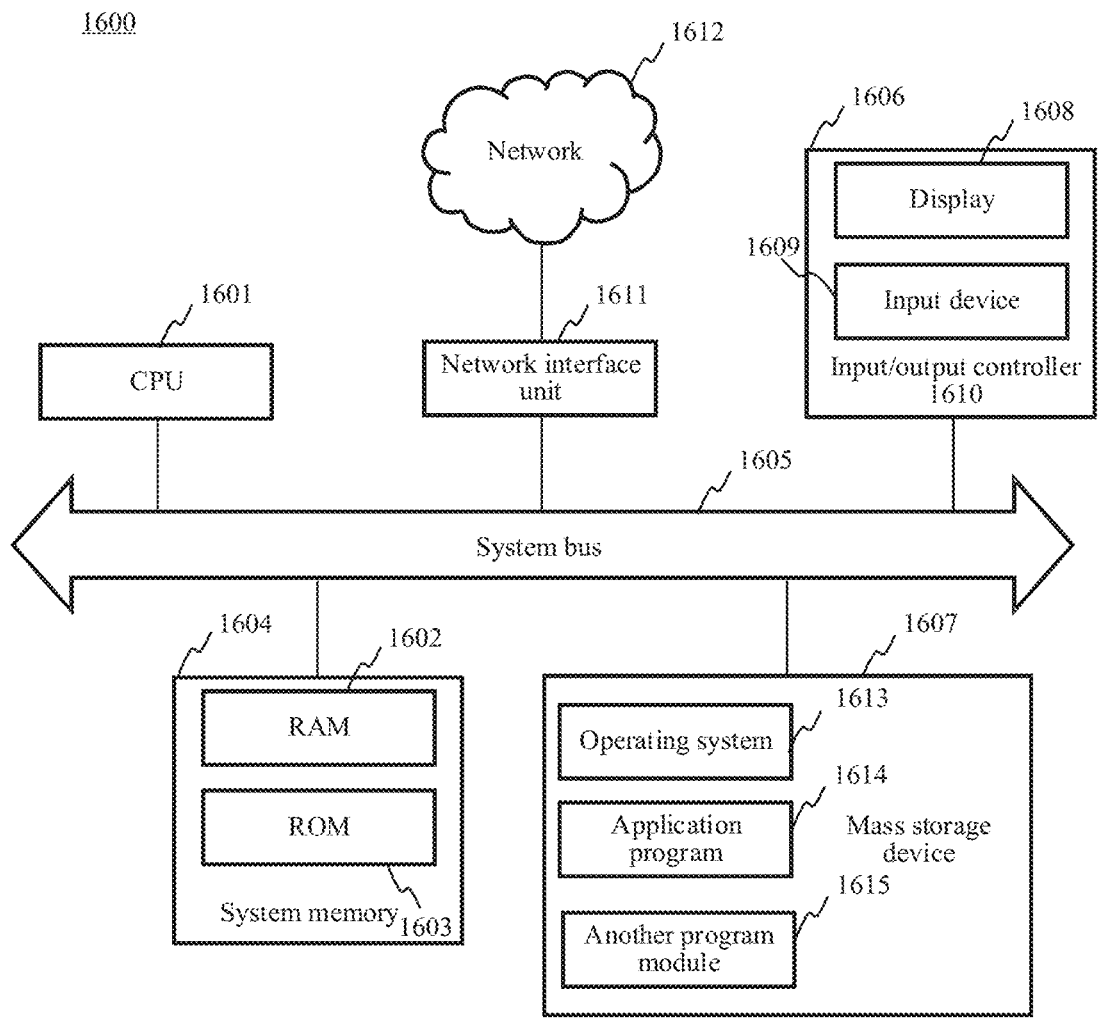
FIG. 16 is a schematic structural diagram of a server according to an exemplary embodiment of this application.

FIG. 16 is a schematic structural diagram of a server according to an embodiment of this application. The server is configured to implement the mini program production method provided in the foregoing embodiments. Specifically:

A server 1600 includes a central processing unit (CPU) 1601, a system memory 1604 including a random access memory (RAM) 1602 and a read-only memory (ROM) 1603, and a system bus 1605 connecting the system memory 1604 and the CPU 1601. The server 1600 further includes a basic I/O system 1606 for transmitting information between components in a computer, and a mass storage device 1607 configured to store an operating system 1613, an application program 1614, and another program module 1615.

The basic I/O system 1606 includes a display 1608 configured to display information and an input device 1609 such as a mouse or a keyboard that is configured to input information by a user. The display 1608 and the input device 1609 are both connected to the CPU 1601 by using an input/output controller 1610 connected to the system bus 1605. The basic I/O system 1606 may further include the input/output controller 1610, configured to receive and process inputs from multiple other devices, such as the keyboard, the mouse, or an electronic stylus. Similarly, the input/output controller 1610 further provides an output to a display screen, a printer, or another type of output device.

The mass storage device 1607 is connected to the CPU 1601 by using a mass storage controller (not shown) connected to the system bus 1605. The mass storage device 1607 and an associated computer-readable medium provide non-volatile storage for the server 1600. That is, the mass storage device 1607 may include a computer-readable medium (not shown), such as a hard disk or a CD-ROM drive.

Without loss of generality, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 1604 and the mass storage device 1607 may be collectively referred to as a memory.

According to the embodiments of this application, the server 1600 may further be connected, by using a network such as the Internet, to a remote computer on the network and run. That is, the server 1600 may be connected to a network 1612 by using a network interface unit 1611 connected to the system bus 1605, or may be connected to another type of network or a remote computer system by using the network interface unit 1611.

The memory stores at least one instruction, at least one program, and a code set or an instruction set, the at least one instruction, the at least one program, and the code set or the instruction set being configured to be executed by one or more processors to implement functions in steps of the mini program production method.

An embodiment of this application further provides a computer-readable storage medium, storing at least one instruction, at least one program, and a code set or an instruction set, the at least one instruction, the at least one program, and the code set or the instruction set being loaded and executed by a processor to implement the mini program production method provided in the foregoing embodiments.

In some embodiments, the computer-readable storage medium may include: a ROM, a RAM, a solid state drive (SSD), an optical disc, or the like. The RAM may include a resistance random access memory (ReRAM) and a dynamic random access memory (DRAM).

An embodiment of this application further provides a computer program product. The computer program product includes computer instructions, the computer instructions being stored in a computer-readable storage medium. A processor of a computer device reads the computer instructions from the computer-readable storage medium, and executes the computer instructions, so that the computer device performs the mini program production method provided in the foregoing aspect or in optional implementations of the foregoing aspect.

The sequence numbers of the foregoing embodiments of this application are merely for description purpose but do not imply the preference among the embodiments. The foregoing descriptions are merely optional embodiments of this application, but are not intended to limit this application. Any modification, equivalent replacement, or improvement made within the spirit and principle of this application shall fall within the protection scope of this application.

What is claimed is:

1. A mini program production method performed at a terminal, the mini program being a program executed in a host application program, and the method comprising:
   displaying a mini program production interface including a panel region and an editing region, the panel region being provided with n types of basic user interface (UI) elements, n being a positive integer;
   in response to receiving an editing operation on a target basic UI element that includes moving the target basic UI element from the panel region to the editing region, generating a program interface of the mini program by editing, in the editing region, one or more target basic UI elements, the target basic UI element being selected from the n types of basic UI elements in the panel region;
   generating a program package of the mini program according to the program interface; and
   in response to receiving a preview operation, transmitting the program package of the mini program to the host application program for execution, wherein the host application program displays an icon of the mini program in response to a search on a mini program searching interface of the host application program.

2. The method according to claim 1, wherein the generating a program interface of the mini program by editing, in the editing region, one or more target basic UI elements comprises:
   performing, in response to receiving a page editing operation on a target basic UI element, typesetting editing on the target basic UI element in the editing region according to the page editing operation to obtain a visual part in the program interface; and
   performing, in response to receiving a logic editing operation on the target basic UI element, logic editing on the target basic UI element in the editing region according to the logic editing operation to obtain a logic running part in the program interface.

3. The method according to claim 2, wherein the performing, in response to receiving a page editing operation on the target basic UI element, typesetting editing on a target basic UI element in the editing region according to the page editing operation to obtain a visual part in the program interface comprises at least one of the following operations:
   adding, in response to receiving a selection operation on the target basic UI element, the target basic UI element to the program interface according to the selection operation;
   moving, in response to receiving a movement operation on the target basic UI element, a position of the target basic UI element in the program interface according to the movement operation; and
   changing, in response to receiving a zooming operation on the target basic UI element, a size of the target basic UI element in the program interface according to the zooming operation.

4. The method according to claim 2, wherein the performing, in response to receiving a logic editing operation on the target basic UI element, logic editing on the target basic UI element in the editing region according to the logic editing operation to obtain a logic running part in the program interface comprises:
   performing, in response to receiving a first logic editing operation on the target basic UI element, data binding on the target basic UI element and static data in the editing region according to the first logic editing operation, the static data being data written into the target basic UI element in advance for display;
   performing, in response to receiving a second logic editing operation on the target basic UI element, data binding on the target basic UI element and first dynamic data in the editing region according to the second logic editing operation, the first dynamic data being data that is dynamically obtained by using a network protocol in a running process of the mini program and that is displayed in the target basic UI element; and
   performing, in response to receiving a third logic editing operation on the target basic UI element, data binding on the target basic UI element and second dynamic data in the editing region according to the third logic editing operation, the second dynamic data being data that is written after being calculated by using native code in a running process of the mini program and that is displayed in the target basic UI element.

5. The method according to claim 4, wherein the method further comprises:
   performing, in response to receiving an unbinding operation on the target basic UI element, data unbinding on data corresponding to the target basic UI element according to the unbinding operation.

6. The method according to claim 2, wherein the program interface comprises a first program interface and a second program interface that have a hierarchical display relationship; and
   the performing, in response to receiving a logic editing operation on the target basic UI element, logic editing on the target basic UI element in the editing region according to the logic editing operation to obtain a logic running part in the program interface comprises:
   performing, in response to receiving a second logic editing operation on the target basic UI element in the first program interface, data binding on the target basic UI element and the second program interface in the editing region according to the second logic editing operation, the second program interface being a program interface jumped to and displayed after the target basic UI element is triggered.

7. The method according to claim 1, wherein the method further comprises:
   displaying, in response to a preset triggering operation on a target basic UI element in the editing region, mini program code corresponding to the target basic UI element in a code display region of the editing region; and
   updating, in response to receiving an encoding operation on the mini program code in the code display region, the mini program code corresponding to the target basic UI element according to the encoding operation.

8. The method according to claim 1, wherein the mini program production interface further comprises a submitting control; and
   the method further comprises:
   transmitting, in response to receiving a submitting operation on the submitting control, the program package of the mini program to the program platform of the host application program for auditing or publishing.

9. A terminal, comprising a processor and a memory, the memory storing at least one instruction, the at least one instruction being executed by the processor to perform a plurality of operations for producing a mini program to be executed in a host application program, the plurality of operations including:
  displaying a mini program production interface including a panel region and an editing region, the panel region being provided with n types of basic user interface (UI) elements, n being a positive integer;
  in response to receiving an editing operation on a target basic UI element that includes moving the target basic UI element from the panel region to the editing region, generating a program interface of the mini program by editing, in the editing region, one or more target basic UI elements, the target basic UI element being selected from the n types of basic UI elements in the panel region;
  generating a program package of the mini program according to the program interface; and
  in response to receiving a preview operation, transmitting the program package of the mini program to the host application program for execution wherein the host application program displays an icon of the mini program in response to a search on a mini program searching interface of the host application program.

10. The terminal according to claim 9, wherein the generating a program interface of the mini program by editing, in the editing region, one or more target basic UI elements comprises:
  performing, in response to receiving a page editing operation on a target basic UI element, typesetting editing on the target basic UI element in the editing region according to the page editing operation to obtain a visual part in the program interface; and
  performing, in response to receiving a logic editing operation on the target basic UI element, logic editing on the target basic UI element in the editing region according to the logic editing operation to obtain a logic running part in the program interface.

11. The terminal according to claim 10, wherein the performing, in response to receiving a page editing operation on the target basic UI element, typesetting editing on a target basic UI element in the editing region according to the page editing operation to obtain a visual part in the program interface comprises at least one of the following operations:
  adding, in response to receiving a selection operation on the target basic UI element, the target basic UI element to the program interface according to the selection operation;
  moving, in response to receiving a movement operation on the target basic UI element, a position of the target basic UI element in the program interface according to the movement operation; and
  changing, in response to receiving a zooming operation on the target basic UI element, a size of the target basic UI element in the program interface according to the zooming operation.

12. The terminal according to claim 10, wherein the performing, in response to receiving a logic editing operation on the target basic UI element, logic editing on the target basic UI element in the editing region according to the logic editing operation to obtain a logic running part in the program interface comprises:
  performing, in response to receiving a first logic editing operation on the target basic UI element, data binding on the target basic UI element and static data in the editing region according to the first logic editing operation, the static data being data written into the target basic UI element in advance for display;
  performing, in response to receiving a second logic editing operation on the target basic UI element, data binding on the target basic UI element and first dynamic data in the editing region according to the second logic editing operation, the first dynamic data being data that is dynamically obtained by using a network protocol in a running process of the mini program and that is displayed in the target basic UI element; and
  performing, in response to receiving a third logic editing operation on the target basic UI element, data binding on the target basic UI element and second dynamic data in the editing region according to the third logic editing operation, the second dynamic data being data that is written after being calculated by using native code in a running process of the mini program and that is displayed in the target basic UI element.

13. The terminal according to claim 12, wherein the plurality of operations further comprise:
  performing, in response to receiving an unbinding operation on the target basic UI element, data unbinding on data corresponding to the target basic UI element according to the unbinding operation.

14. The terminal according to claim 10, wherein the program interface comprises a first program interface and a second program interface that have a hierarchical display relationship; and
  the performing, in response to receiving a logic editing operation on the target basic UI element, logic editing on the target basic UI element in the editing region according to the logic editing operation to obtain a logic running part in the program interface comprises:
  performing, in response to receiving a second logic editing operation on the target basic UI element in the first program interface, data binding on the target basic UI element and the second program interface in the editing region according to the second logic editing operation, the second program interface being a program interface jumped to and displayed after the target basic UI element is triggered.

15. The terminal according to claim 9, wherein the plurality of operations further comprise:
  displaying, in response to a preset triggering operation on a target basic UI element in the editing region, mini program code corresponding to the target basic UI element in a code display region of the editing region; and
  updating, in response to receiving an encoding operation on the mini program code in the code display region, the mini program code corresponding to the target basic UI element according to the encoding operation.

16. A non-transitory computer-readable storage medium, storing at least one instruction, the at least one instruction being executed by a processor of a terminal to perform a plurality of operations for producing a mini program to be executed in a host application program, the plurality of operations including:
  displaying a mini program production interface including a panel region and an editing region, the panel region being provided with n types of basic user interface (UI) elements, n being a positive integer;

in response to receiving an editing operation on a target basic UI element that includes moving the target basic UI element from the panel region to the editing region, generating a program interface of the mini program by editing, in the editing region, one or more target basic UI elements, the target basic UI element being selected from the n types of basic UI elements in the panel region;

generating a program package of the mini program according to the program interface; and in response to receiving a preview operation, transmitting the program package of the mini program to the host application program for execution wherein the host application program displays an icon of the mini program in response to a search on a mini program searching interface of the host application program.

17. The non-transitory computer-readable storage medium according to claim 16, wherein the generating a program interface of the mini program by editing, in the editing region, one or more target basic UI elements comprises:

performing, in response to receiving a page editing operation on a target basic UI element, typesetting editing on the target basic UI element in the editing region according to the page editing operation to obtain a visual part in the program interface; and performing, in response to receiving a logic editing operation on the target basic UI element, logic editing on the target basic UI element in the editing region according to the logic editing operation to obtain a logic running part in the program interface.

18. The non-transitory computer-readable storage medium according to claim 17, wherein the performing, in response to receiving a page editing operation on the target basic UI element, typesetting editing on a target basic UI element in the editing region according to the page editing operation to obtain a visual part in the program interface comprises at least one of the following operations:

adding, in response to receiving a selection operation on the target basic UI element, the target basic UI element to the program interface according to the selection operation;

moving, in response to receiving a movement operation on the target basic UI element, a position of the target basic UI element in the program interface according to the movement operation; and changing, in response to receiving a zooming operation on the target basic UI element, a size of the target basic UI element in the program interface according to the zooming operation.

19. The non-transitory computer-readable storage medium according to claim 17, wherein the performing, in response to receiving a logic editing operation on the target basic UI element, logic editing on the target basic UI element in the editing region according to the logic editing operation to obtain a logic running part in the program interface comprises:

performing, in response to receiving a first logic editing operation on the target basic UI element, data binding on the target basic UI element and static data in the editing region according to the first logic editing operation, the static data being data written into the target basic UI element in advance for display;

performing, in response to receiving a second logic editing operation on the target basic UI element, data binding on the target basic UI element and first dynamic data in the editing region according to the second logic editing operation, the first dynamic data being data that is dynamically obtained by using a network protocol in a running process of the mini program and that is displayed in the target basic UI element; and performing, in response to receiving a third logic editing operation on the target basic UI element, data binding on the target basic UI element and second dynamic data in the editing region according to the third logic editing operation, the second dynamic data being data that is written after being calculated by using native code in a running process of the mini program and that is displayed in the target basic UI element.

20. The non-transitory computer-readable storage medium according to claim 16, wherein the plurality of operations further comprise:

displaying, in response to a preset triggering operation on a target basic UI element in the editing region, mini program code corresponding to the target basic UI element in a code display region of the editing region; and updating, in response to receiving an encoding operation on the mini program code in the code display region, the mini program code corresponding to the target basic UI element according to the encoding operation.

* * * * *